United States Patent [19]

Yoshimura et al.

[11] 4,430,377

[45] Feb. 7, 1984

[54] COLD DRAWN HIGH-ORIENTATION MULTILAYERED FILM AND PROCESS FOR MANUFACTURE OF SAID FILM

[75] Inventors: Isao Yoshimura, Fujisawa; Osamu Mizukami, Kawasaki; Hideo Hata; Junichi Kageyama, both of Yokohama; Takashi Kaneko, Kawasaki, all of Japan

[73] Assignee: Asahi-Dow Limited, Tokyo, Japan

[21] Appl. No.: 459,985

[22] Filed: Jan. 21, 1983

Related U.S. Application Data

[60] Division of Ser. No. 326,062, Nov. 30, 1981, Pat. No. 4,399,181, which is a continuation of Ser. No. 103,949, Dec. 14, 1979, abandoned.

[30] Foreign Application Priority Data

Dec. 18, 1978 [JP] Japan .................. 53-154966
Mar. 7, 1979 [JP] Japan .................. 54-25642

[51] Int. Cl.³ .............................. B32B 27/08
[52] U.S. Cl. ........................ 428/213; 428/332; 428/339; 428/476.1; 428/483; 428/500; 428/515; 428/518; 428/910
[58] Field of Search .............. 428/213, 332, 339, 474, 428/483, 500, 515, 518, 231, 516, 476.1, 910

[56] References Cited

U.S. PATENT DOCUMENTS

| | | | |
|---|---|---|---|
| 3,375,126 | 3/1968 | Nagel | 428/518 |
| 3,524,795 | 8/1970 | Peterson | 428/518 |
| 3,579,416 | 5/1971 | Schrenk | 428/518 |
| 3,682,767 | 8/1982 | Britton | 428/518 |
| 3,847,728 | 11/1974 | Hirata | 428/518 |
| 3,908,070 | 9/1975 | Marzoif | 428/518 |
| 4,082,877 | 4/1978 | Shadle | 428/518 |
| 4,112,181 | 9/1978 | Baird | 428/518 |
| 4,161,562 | 7/1979 | Yoshikawa | 428/518 |

Primary Examiner—Marion E. McCamish
Attorney, Agent, or Firm—Cushman, Darby & Cushman

[57] ABSTRACT

A high-orientation multilayered film incorporates at least one cold drawn, highly oriented resin layer excellent in mechanical strength and suitable mainly for use as packaging material. Because of its specific stratal construction which is highly adaptable to afford a wide variety of specific functions, the composite film is suitable for manufacture of thermally shrinkable films which excel in transparency and in ability to shrink rapidly particularly at low temperatures. Also disclosed is a process for drawing at specific low temperatures at high expansion ratios the aforementioned multiplicity of resin layers either all by themselves or in conjunction with layers of other resins by utilizing the cold drawability of the aforementioned resin layers excelling in mechanical strength.

33 Claims, 2 Drawing Figures

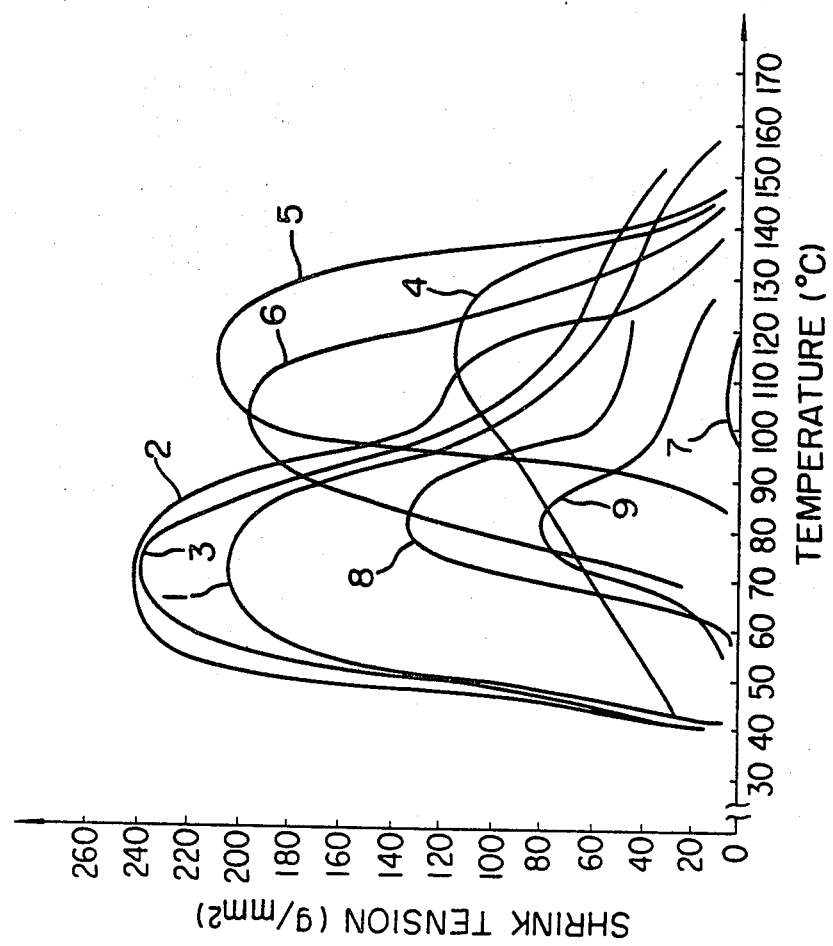

COLD DRAWN HIGH-ORIENTATION MULTILAYERED FILM AND PROCESS FOR MANUFACTURE OF SAID FILM

This is a division of application Ser. No. 326,062, filed Nov. 30, 1981, now U.S. Pat. No. 4,399,181, which is a continuation of Ser. No. 103,949, filed Dec. 14, 1979, and now abandoned.

BACKGROUND OF THE INVENTION

Packages formed with films are manufactured by a good number of methods which utilize to advantage the characteristics of the films such as the bag sealing method, twist wrapping method, thermal shrink wrapping method, cohesive wrapping method by use of specific films represented by Saran Wrap (product by Asahi-Dow Limited), stretch wrapping method, skin packing method intended to provide intimate adhesion between the film and its contents by virtue of heat and vacuum, vacuum packing method designed to produce tightly drawn packages by means of evacuation and the like. These methods require respective wrapping characteristics. For each packaging method, therefore, it is important to select a film whose basic material, composition, form and characteristic attributes best suit the wrapping characteristics of the particular method employed.

The films of this class, depending on various uses found therefor, are required to possess a broad spectrum of properties befitting an assortment of factors including the kind of article to be wrapped, the condition of preservation of the wrapped article and the like. Recently, owing to increasingly more exaction of special properties, the practice of using composite films formed of a multiplicity of layers of varying properties has come to find favorable acceptance. The multilayered film which is produced by preparing a substantially unoriented film or oriented film, then melt extruding other resin into a film and laminating the freshly extruded film with the former film offers one example.

A film of improved heat sealing property produced by fusion laminating an unoriented polypropylene layer of the cast method (called as "C.PP") or an oriented polypropylene layer (O.PP) with a layer of other resin and a film coated with a vinylidene chloride type latex or solvent to acquire a barrier property (called as "K-coat film") are other examples. These and other various types of films and their various combinations are selected to suit numerous applications.

On the other hand, a coextruded film which is produced by melting several different resins in some extruders and, with the aid of a multilayered die, joining the respective extruded sheets of the resins within the die, fusing the joined resin sheets, extruding the resultant composite sheet and cooling it into a film or sheet is widely known.

The optimum extruding and stretching conditions required for successful conversion of these multilayered sheets into highly oriented films vary from one to another of the resins used in the component layers making up the composite sheets. Owing to this variability of the optimal extruding and stretching conditions, the films under production suffer detestable phenomena such as inconsistent wall thickness, streaks, puncture, rupture, layer separation, and blushing due to coarsened interfaces, and the properties acquired by the produced films differ from those the films are expected to acquire. Elimination of these difficulties has turned out to be an extremely difficult task.

This invention aims to provide films which are usable for various purposes, particularly films which satisfy the purpose of shrink wrapping. Now the films of the kind produced by this invention specifically for the purpose of shrink wrapping will be described below by way of illustration of the invention.

Generally, the shrink wrapping method, on the principle of full use of the heat shrink property of a film which has been stretched to acquire a specifically set orientation, comprises the steps of loosely pre-wrapping or sealing a given article subjected to wrapping so as to enclose the article with the film and, thereafter, exposing the film to a heat medium such as current of hot air, infrared ray, hot water, and the like and thereby causing the film to shrink and come into tight contact with the overall contour of the article. This method is characterized by the fact that the produced package has beautiful appearance enough to add to the commodity value of the wrapped article, keeps the contents hygienic, permits shoppers to examine the quality of the contents by the senses of vision and touch, keeps the contents tightly in position no matter whether the article consists of a plurality of pieces or a single piece and provides the contents with ample protection against vibrations and impacts. Compared with the stretched wrapping method which is used extensively as in supermarkets, the shrink wrapping method enjoys high speed of wrapping work. The shrink wrapping method is now finding general acceptance with ever increasing impetus in the industrial packaging operations which generally involve articles too voluminous and heavy to be advantageously handled by the stretch wrapping method alone. This fact has come to attract keen attention of the industry.

Articles which are too irregular in contour to be packaged by the stretch wrapping method and articles which do not permit use of rigid auxiliary containers such as trays can be advantageously packaged by this shrink wrapping method. Further, this method enjoys the advantage that the article can be packaged with more tightness than by any other method. Despite these advantages, this method still has the disadvantage that the film wrapped around the article must be heated thoroughly until it amply shrinks.

The film currently used most extensively by this shrink wrapping method is a drawn film of plastic polyvinyl chloride (hereinafter referred to as "PVC") resin. The popular use of this film is ascribed to the film's outstanding ability to produce high degree of heat shrinkage at a relatively low temperature and provide advantageous shrink wrapping in a wide range of temperatures. On the other hand, this film is deficient in heat sealing property, preservability (due to inclination toward lose of orientation by the action of a plasticizer), and moistureproofness. It further entails hard problems such as the impairment of hygiene by the plasticizer, emission of chlorine type gas and other noxious gases during the fusion of film by the heated wire, liberation of corrosive noxious gases during the combustion of film in the incinerator, inferior resistivity of the film to cold weather and consequent inclination of the film toward rigidification, embrittlement and rupture.

As a result, increasing attention has come to be focussed on adoption of polypropylene (hereinafter referred to as "PP") type film for the shrink wrapping method in recent years. Unfortunately, the PP film is inferior in shrinkability to the PVC film. The drawn PP type film excels in mechanical properties, moisture-proofness, heat seal strength, heat resistance, film modulus, and the like and, therefore, proves highly suitable for use as a shrink wrapping film.

It is also advantageous over the PVC film is respect that the cost of raw material and the specific gravity are both lower than those of the PVC film. Since PP is a rigid crystalline high polymer possessing a high softening point, the PP film shrink at higher temperatures than the conventional drawn films and exhibit a small shrink percentage at low temperatures in the neighborhood of 100° C. In the process of shrink wrapping, therefore, the PP film must be heated at a higher temperature. Further because of sharp dependence of the shrink percentage upon temperature, the film in the course of wrapping undergoes locally uneven heating and entails uneven shrinkage which tends to induce such phenomena as "wrinkles" and "unshrinking spots" which are highly quite detestable from the viewpoint of practical use of the film. If the film is amply heated to preclude these phenomena, there inevitably ensues the serious disadvantage that the article being wrapped is exposed to excessive heating and the film itself loses transparency and sustain breakage in the sealed portion or around air vents. The PP film preponderantly comes in thin thickness (ex. 15–25μ). If the thickness is increased, the film gains in rigidity, tends to sustain breakage and consequently proves no longer suitable for wrapping.

The conventional polyethylene type film, in its unmodified form, cannot be given sufficient molecular orientation by drawing. The drawn film, therefore, exhibits low heat shrink percentage (particularly heat shrink stress), high shrink temperature, inferior strength and optical properties, and insufficient binding force on wrapped articles. Thus, the film produced in a thickness fairly large by the standard of ordinary wrapping films is adopted for limited, special applications.

The ordinary polyethylene type film which has its molecules thoroughly crosslinked by means of a high-energy ray and which has been amply drawn at a temperature exceeding the polymer's melting point enjoys high processibility, permits ready setting of molecular orientation by drawing in a wide temperature range, exhibits high heat shrink percentage and heat shrink stress, and excels in comparison with the ordinary polyethylene film in various properties such as optical properties and including transparency and specular gloss, heat resistance, and the like. The film, however, shrinks at high temperatures and permits no easy heat sealing. When the film is subjected to shrink wrapping, therefore, it is degraded in strength, heat sealing property, and tear resistance and, consequently, is rendered susceptible to tear.

Further, the film suffers from problems such as great difficulty involved in the cutting and sealing of the film by use of an electric heat wire, degradation of physical properties, particularly optical properties, of the film in consequence of the heat shrinking treatment, degradation of film strength, infliction of rupture around the air vents in the film during the shrink wrapping, and ready formation of wrinkles in the film. The film, accordingly, suffers from low packaging speed and inferior package finish.

As implied above, one critical property the film is required to possess for successful shrink wrapping is the ability to permit satisfactory wrapping at low temperatures. This ability is particularly important when the film is used for wrapping fresh foodstuffs.

The manufacture of a drawn film of PP is accomplished by a method comprising the steps of melt extruding the polymer resin through an extruder die, quenching the extruded tubular sheet, reheating the cooled tubular sheet at a high temperature within the range of from 150° to 160° C., and forcing air into the inner cavity of the tubular sheet. In the case of a drawn film of low-density polyethylene, a similarly extruded tubular sheet of the polymer resin is biaxially drawn in an effort to set a high degree of molecular orientation in the film. In the course of the drawing, however, the sheet bursts, making the manufacture of film hardly practicable from the technical point of view.

Because of the difficulty, therefore, there is generally adopted a direct inflation method which comprises the steps of extruding the polymer resin at a temperature within the range of from 180° to 220° C., for example, and subsequently causing the extruded sheet, by means of a proper form of air, to be simultaneously cooled and inflated to a prescribed size.

This inflation method is characterized by being capable of producing the film inexpensively and very easily. The drawing effected in this method, however, causes disturbance and crystallization of the polymer molecules, degrades the film's optical properties, and fails to set the molecular orientation as desired. The film, therefore, has low heat shrink percentage and low heat shrink stress and shrinks at temperatures rather high by any standard. Hence, the film produced in a large thickness barely finds utility in limited special applications. With a view to preventing the disturbance of molecules and permitting the desired setting of thorough molecular orientation, there have been developed different methods, including one comprising the steps of molding the low-density polyethylene, then exposing the molded polymer to a high-energy radiant ray under a suitable set of conditions for thereby causing partial crosslinking of the molecules and, thereafter, reheating the molded polymer and drawing it at the elevated temperature. The film obtained by the conventional method, nevertheless, is not free from the aforementioned disadvantages in any case.

Many methods have been proposed for producing a film by inflating a multilayered sheet incorporating layers of different polyolefins or layers of both polyolefins and other polymers. For example, U.S. Pat. No. 3,682,767 discloses a film possessing improved melt strength and heat sealing property and exhibiting improved make-and-fill property in the wrapping of a liquid article, manufactured by the steps of mixing a copolymer of ethylene and an olefinically unsaturated monomer such as, for example, ethylene-vinyl acetate copolymer (hereinafter referred to as "EVA") with a linear copolymer of ethylene of a density of 0.93 to 0.96 g/cm$^3$ and an α-olefin such as, for example, a modified high-density polyethylene (hereinafter referred to as "HDPE") and extruding the resultant mixture into a flat or tubular film. British Pat. No. 998,299 teaches a printable polyethylene film which is produced by the steps of mixing polyethylene such as low-density polyethylene (hereinafter referred to as "LDPE") or HDPE with EVA, subjecting the resultant mixture to a crosslinking treatment, and drawing the mixture into a film. And British Pat. No. 1,035,887 discloses a film excellent in low-temperature strength and other properties, which is produced by the steps of mixing LDPE with a linear medium-density polyethylene modified with a small amount of butene and drawing the mixture.

As concerns methods proposed heretofore for the manufacture of films, British Pat. No. 998,299 mentioned above discloses a method which comprises causing crosslinking of molecules in the aforementioned composition by subjecting the composition to a treatment with a peroxide or high-energy radiant ray, heating the sheet to a temperature around or higher than the melting point of polyethylene, and drawing the sheet as held at that temperature and British Pat. No. 992,897 discloses a method which comprises causing crosslinking of molecules in EVA by a treatment with a high-energy radiant ray, heating the sheet to an elevated temperature (preferably 100° to 120° C., for example), and drawing it at that elevated temperature. The films obtained by using these methods or compositions do not possess such outstanding optical properties, strength properties and low-temperature shrink properties as those obtained by the PVC film as described above, and they are also deficient in film-forming property and other similar properties.

Of the articles of the class which are packed by the shrink wrapping method, raw meat, processed meat, cheese, and other marine products and livestock products generally have quite irregular shape and are susceptible to deterioration due to the action of air. For protection against the deterioration, therefore, such an article is shrink wrapped by first vacuum packaging the article with an $O_2$-barrier film and shrinking the film with hot water for thereby causing the film to contract and come into tight contact with the overall contour of the article. The package thus obtained prevents possible leakage of meat juice or other liquid, preclude possible formation of wrinkles and occurrence of pinholes particularly in the barrier layer of the film and beautifies the outside appearance of the article contained. In the case of the package described above, since the film is exposed to direct contact with the food article which generally has been stored at normal room temperature or in a refrigerated space, the temperature of the film is not readily elevated and the shrinking treatment performed at a high temperature for a long time is detested as highly undesirable from the standpoint of the preservation of freshness of the food under treatment. For the shrink wrapping of such articles, therefore, need is felt for adoption of a film which shrinks quickly at a very low temperature and exhibits high shrink tension and heat sealing property. From the standpoint of workability, the film is required to possess modulus and cold resistance. A typical example of the conventional films which satisfy this requirement is offered by U.S. Pat. No. 3,741,253, which teaches a method comprising the steps of first preparing an innermost EVA layer in a tubular form, causing crosslinking of molecules in this layer with a treatment using a high-energy radiant ray, then coating this tubular layer with an $O_2$-barrier layer of vinylidene chloride polymer, subsequently fusion superposing another EVA layer on the coated tubular layer, and thereafter drawing the multilayered sheet at a temperature such as 88° C. which causes no appreciable high molecular orientation of the vinylidene chloride type polymer and under conditions which cause no appreciable high molecular orientation of the other polymers used in the film in comparison with this invention. This film incorporates an $O_2$-barrier layer made of a vinylidene chloride type polymer. In this case, the method used for the manufacture of the film is so complicate as to render the quality control both difficult and expensive, the component layers of the film suffer from complicate thermal hysteresis and consequently are deprived of the effect of sudden cooling, and the drawing stability of the sheet is governed by the particular component EVA. If the drawing is carried out at a temperature falling short of 88° C., for example, the sheet being drawn sustains puncture so readily as to render the drawing impracticable. Consequently, the shrink property of the film is degraded, the degrees of orientation of the component layers even including the vinylidene chloride type layer are lowered, and various other properties are likewise impaired. Besides, because of the crosslinking in the innermost layer, the film exhibits poor heat sealing property and becomes susceptible to curling. In addition, the film suffers from the phenomenon of layer separation in the course of the shrinking treatment. The vinylidene chloride layer, generally when it is quenched in the preparation of the raw sheet, assumes an amorphous rubbery state and then, with lapse of time, undergoes gradual crystallization. This crystallization tends to start within several minutes of the formation of the amorphous rubbery layer at the normal temperature. If, at this time, the layer is exposed to heat as from the lamination, it may possibly be deprived of the effect of quenching or the uniformity of texture. When the quenched layer is left to undergo crystallization in that case, it no longer exhibits elasticity and becomes brittle. This embrittlement tends to occur also when the drawing is effected at a very high temperature. Even when this layer is used as an inner layer in the film, a bend given to the film results in the formation of pinholes in this inner layer and the film, therefore, no longer retains its barrier property. Generally, for the vinylidene chloride type polymer to manifest its strength and other properties to advantage, it is extruded through a die directly into cold water (cooled to 8° C. with ice, for example) to assume an amorphous rubbery texture. It cannot produce a film of well-balanced strength properties unless it is drawn at an extremely low temperature (such as 30° C., for example). Under these conditions, the crystallization is generally accelerated by the orientation due to the drawing so that the crystallization is substantially completed in the course of the drawing and the molecular orientation is stably set by the end of the crystalization. When the drawing is carried out at a higher temperature, the molecular orientation in the vinylidene chloride layer begins to proceed gradually after the drawing of the other component layers of the film have been brought to completion. The film which is consequently obtained possesses a substantially low degree of molecular orientation and lacks strength, resistance to infliction of pinholes, and shrinking property. In this case, there is a wide gap between the temperature range in which the EVA resin (such as near melting point, for example) can be drawn and the optimum temperature range in which the vinylidene chloride resin (such as 30°-35° C., for example) can be drawn. After all, the temperature at which the film can be stably drawn falls around the aforementioned temperature range even when the temperature for effective drawing of the innermost layer is lowered, though to a slight extent, by means of crosslinkage and the proportion of the thickness of the innermost layer to the combined thickness of the remaining component layers of the film is substantially increased, say to 75%. The temperature may be decreased if the vinyl acetate content of the EVA polymer which is the principal layer was increased. The increased vinyl acetate content of the EVA polymer, however, brings about a serious disadvantage that the film is heavily degraded in shrinking property, shrink tension, heat-sealing property, heat resistance, strength, elastic modulus and the like and further impaired in time-course stability.

SUMMARY OF THE INVENTION

The inventors continued a study with a view to mending the various disadvantages suffered by the conventional films and methods touched upon above. This study has led to development of a cold drawn high-orientation multilayered film and a process for the manufacture of the film which, owing to synergistic combination of the cold drawability of a specific resin and the high cold orientation effected in principal component layers of film, enjoys improvements in its strength properties, particularly impact strength, heat-sealing property, optical properties, surface property and other special functions without any impairment of other properties. This film combines a special function of the characteristics which the conventional polyolefin type films, plasticized PVC type film, and PP type film and those of the multilayered film cannot possess. The process by which this excellent film of the present invention is manufactured relies on the synergism of the specific composition of raw materials and the stratal construction of component layers of film and, therefore, excels in the performance of the work of film drawing.

An object of this invention is characterized by providing a shrinking film which exhibits outstanding heat shrink properties, i.e. heat shrink percentage and heat shrink tension particularly at low temperatures, and generous dependence of the heat shrink property upon temperature. It should be noted, however, that the present invention is not limited to the film's excellence in this respect alone.

The film of this invention is a cold drawn high-orientation multilayered film, having a tensile strength of not less than 5.0 kg/mm², the principal component layers of said film being highly oriented and including at least one layer preponderantly containing a cold-drawable resin selected from the group consisting of blended and unblended specific polymers, [1] (B)+(A)+(C), [2] (B)+(A), [3] (B)+(C), [4] (D), and [5] (E), wherein, (A) is at least one ethylene type polymer selected from the group consisting of copolymers of ethylene with other monomers such as vinyl esters, aliphatic unsaturated carboxylic acids and alkyl esters of said carboxylic acids, ionically crosslinked resins derived from said copolymers, and low-density polymers of ethylene, (B) is a soft copolymer elastomer having a Vicat softening point of not more than 60° C., (C) is at least one polymer selected from the group consisting of crystalline polypropylene, high-density polyethylene, crystalline polybutene-1 and polymethyl pentene-1, (D) is a crystalline polybutene-1 having a concentration of 50 to 100% by weight, and (E) is an ionically crosslinked resin.

And, another object of the present invention is to provide a process for the manufacture of the multilayered film, which comprises extruding a cold drawable resin into a molten sheet or film, quenching it to solidify, preparing a multilayered raw sheet or film including the cold drawable resin layer at least one, cold drawing the multilayered raw sheet or film at a temperature within the range of from 20° to 80° C. to an area stretching ratio in the range of from 3 to 30 times the original dimension and thereby allowing all the component layers of the sheet or film to be stretched to a high degree and causing the principal component layers of the sheet or film to be oriented to a high degree. The film produced as described above is characterized by manifesting such a high degree of orientation by stretching as has never been attained to date as well as other outstanding properties owing to the synergistic combination of the composition of specific polymers and the stratal construction of component layers and other layers of different resins.

The film which has high degree of orientation uniformly imparted to each of the component layers of film and which excels particularly in strength, transparency, and other various properties can be obtained quite stably under conditions such as low-temperature conditions which depart from the individual drawing conditions proper to the respective specific polymers and other resins making up the multilayered raw sheet or film, viz. the conditions under which the respective specific polymers and other resins can never be drawn effectively. The film of this invention possesses properties appropriate for the film to be advantageously applied to various forms of wrapping, especially but not limitatively to shrink wrapping. The film can be made to excel particularly in optical properties, strength, heat-sealing property, gas-barrier property, low-temperature shrink property, and shrink response (speed).

BRIEF DESCRIPTION OF THE DRAWING

FIG. 2 is a graph showing the interrelationship between the shrink tension of the film and the heat-treating temperature.

In FIGS. 1 and 2, the curve 1 shows the film of the present invention Run No. 1, the curve 2 shows the film of the present invention Run No. 7, the curve 3 shows the film of the present invention Run No. 12, the curve 4 shows the plasticized PVC shrink film 17μ in thickness of the comparative sample (a), the curve 5 shows the PP shrink film 16μ in thickness of the comparative sample (b), the curve 6 shows the commercial uncrosslinked and LDPE shrink film 50μ in thickness, the curve 7 shows the crosslinked polyethylene shrink film 17μ in thickness of the comparative sample (c), the curve 8 shows the barrierable shrink film 71μ in thickness of the comparative sample (d), and the curve 9 shows the barrierable shrink film 69μ in thickness of the comparative sample (e).

DETAILED DESCRIPTION OF THE INVENTION

Figure 1:
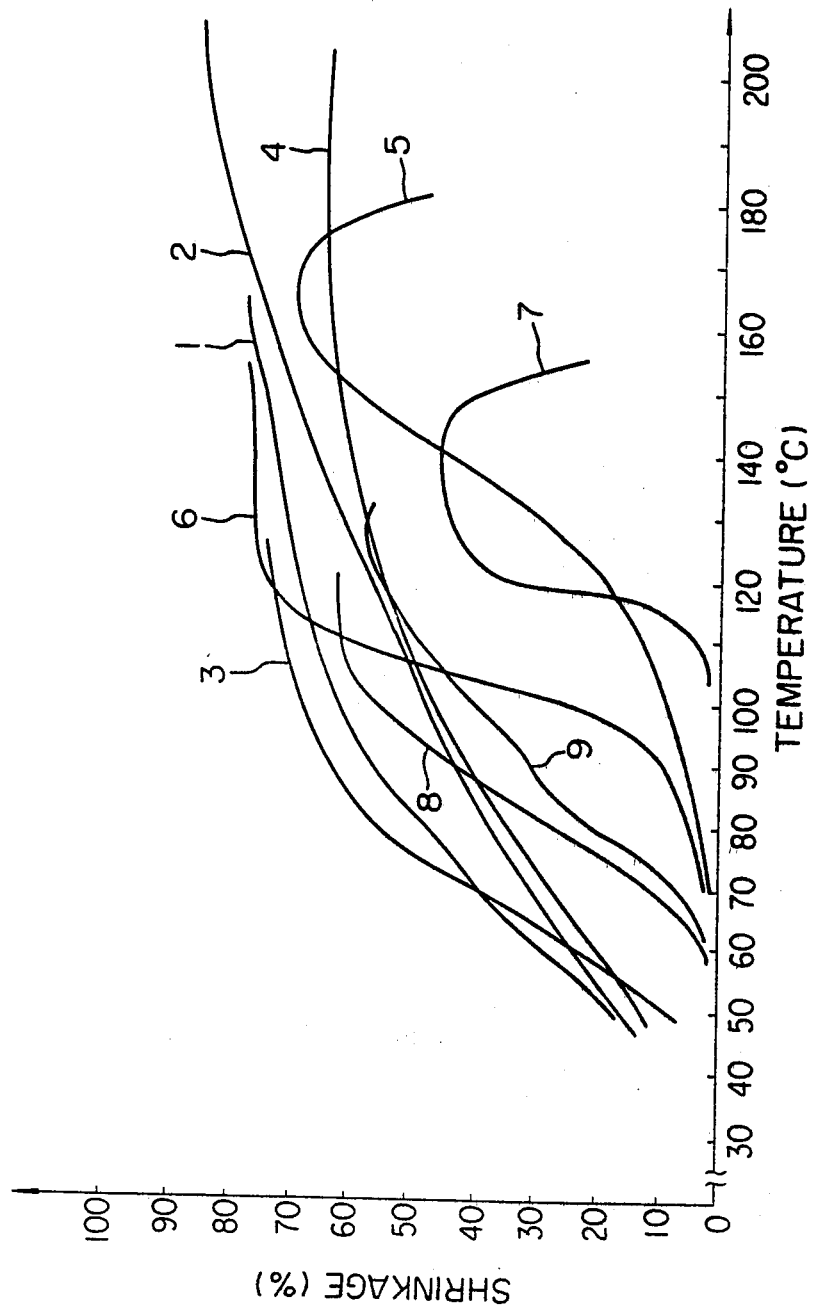
FIG. 1 is a graph showing the interrelationship between the shrink percentage of the film and the heat-treating temperature.

For the purpose of improving the various properties of crystalline polypropylene (hereinafter referred to as "IPP"), particularly the thermal resistance, low-temperature strength and impact strength, Japanese Patent Publication No. 7088/1960, Japanese Patent Publication No. 15042/1961, Japanese Laid-open Patent Publication No. 78977/1977, etc. have disclosed methods for formulating compositions using IPP as the main component and additionally incorporating ethylene-propylene copolymer rubber (hereinafter referred to as "EPR") as a minor component. In the compositions obtained by these methods, however, since the compatibility of IPP and EPR is not necessarily high, the compositions molded in the form of a thin film have coarse surface, exhibit very poor optical properties and offer insufficient strength. With a view to mending this disadvantage, if to only a slight extent, methods for formulating compositions which further incorporate amorphous atactic polypropylene as an additional component have been proposed by Japanese Laid-open Patent Publication No. 112946/1974, Japanese Laid-open Patent Publication No. 96638/1973, etc. U.S. Pat. No. 3,832,270 discloses a method which comprises coating a layer of crosslinked polyethylene with a layer of a composition using IPP as the main component and incorporating the mixture of an atactic PP and polybutene-1 (hereinafter referred to as "PB-1") as a minor component and drawing the composite sheet at 100° C. This method is claimed to improve the tear strength of the produced film. All these methods invariably contemplate effecting desired improvements by incorporation of additives preponderantly comprising PP. The compositions obtained according to these methods, when molded in the form of a thin film, still suffer from difficulties relating to dispersibility of additive components in the main component, film strength, thermal resistance, sealing property and the like.

The composition of the blended specific polymers [1], [2] and [3] which is used in the present invention is capable of not only improving synergistically the heat seal property, various strength properties, flexibility, transparency, moderate stiffness of film (fair modulus of elasticity), resistance to heat, resistance to cold, and adhesiveness with layers of other resins and permitting free adjustment of film texture in a wide range from fair softness to high rigidity. It is also capable of enabling layers of other resins which, when used alone, can never be drawn under the conditions contemplated by the present invention to be successfully drawn when handled in conjunction with the specific component layers of the film of this invention, manifests an effect of conspicuously improving the workability of such resin layers on a synergistic scale and imparting fully balanced properties to the produced film.

In another embodiment of this invention, the multilayered film is produced by preparing a multilayered raw sheet or film including a layer containing the polymer (D) of the specific polymer [4] (e.g., crystalline polybutene-1) and cold drawing the sheet under the specific conditions described herein below. This film is characterized by manifesting a heretofore unattainable high degree of orientation and other excellent properties owing to the synergism of the attributes of the aforementioned polybutene and those of the layers of other resins.

Under conditions such as, for example, low-temperature conditions which depart from the individual conditions proper to the aforementioned polybutene-1 and the other specific polymers making up the multilayered raw sheet or film, viz. the conditions under which the respective specific polymers and other resins can never be effectively drawn, there can be produced the film which has high degree of orientation uniformly imparted to each of the component layers of film and which excels particularly in strength, transparency, and other various properties. This film manifests characteristics which are totally different from those exhibited by a film produced solely of a layer of polybutene-1. When the sheet formed solely of a layer of polybutene-1 is drawn, the produced film is flushed and consequently shows poor optical properties. This film is deficient in tensile strength, tear strength, heat shrink percentage and heat shrink tension, and in seal properties as well. Totally unlike this film, the film of the present invention possesses properties appropriate for the purpose of various forms of wrapping, particularly but not limitatively of shrink wrapping.

Specifically, this film is excellent in tensile strength, impact strength, sealing strength, optical properties, and shrink property.

In yet another embodiment of this invention, there is obtained a film of excellent properties by preparing a multilayered sheet including one layer formed of the polymer (E) of the specific polymer [5] which is an ionically crosslinked resin and cold drawing the sheet under specific conditions.

The polymer (A) of the blended specific polymers [1] and [2] is a polymer of relatively low crystallinity (falling within the range of from 60 to 10% as determined by the X-ray method) with consistency intermediate between the degrees of rigidity and softness. It is selected from the group consisting of copolymers of ethylene with vinyl ester monomer, aliphatic unsaturated carboxylic acids and alkyl ester derivatives of said carboxylic acids and LDPE. Desirable examples of the specific polymer (A) are EVA, ethylene-ethyl acrylate copolymer (EEA), ethylenemethyl methacrylate copolymer (EMMA), ethylene-acrylic acid copolymer (EAA), ethylene-methacrylic acid copolymer (EMA), an ionically crosslinked resin which is a copolymer of ethylene and aliphatic unsaturated carboxylic acid, the carboxyl group of said copolymer being at least partially ionized with metal, and said ionically crosslinked resin is obtained by at least partially saponifying an aliphatic unsaturated alkyl carboxylate and then subjecting the product of saponification to at least partial ionic bonding with metal. The combined amount of the component monomers of such a copolymer excepting ethylene is desired to fall within the range of from 1 to 13 mol%, preferably from 2 to 12 mol%. When this amount exceeds 1 mol%, the produced film excels in seal property, flexibility, various strength properties, and the like. When the amount exceeds 13 mol%, however, the film is deficient in extrudability, compatibility with other components, drawability, and the like. When this specific polymer is extruded in the form of a film, particularly in the outer layer, it exhibits inferior optical properties, low strength and poor resistance to heat, with the result that the opposed surfaces of adjacent layers in the film tend to induce the phenomenon of mutual blocking even to the extent of rendering the film handling difficult. The melt index [determined in accordance with ASTM D-1238 (190° C.)] of the specific polymer generally falls within the range of from 0.2 to 10, preferably from 0.3 to 5. When the melt index (MI) falls below 0.2, the compatibility of the components of the composition and the extrudability of the resulting blend of such components are not satisfactory. When MI exceeds 10, the blend as the basic material at times fails to provide sufficient strength. While the sheet is being drawn, for example, the bubble formed in the process of inflation tends to sustain rupture. These adverse inclinations are similarly experienced when the sheet is given a post-treatment for crosslinking. Of the various copolymers usable as the polymer (A) in the composition of the present invention, EVA proves to be the most desirable polymer. In the case of LDPE, there are times when it proves desirable to increase the amount of the polymer (B) or subject the polymer to a treatment for crosslinking.

The soft copolymer elastomer as the polymer (B) of the blended specific polymers [1], [2] and [3] is selected from the group consisting of elastomers possessing a Vicat softening point (hereinafter referred to as "VSP") of not more than 60° C., or preferably not more than 50° C., more preferably not more than 40° C., such as, for example, copolymer elastomer of ethylene with an $\alpha$-olefin, buthyl rubber and block-copolymerized thermoplastic elastomers of styrene-conjugated diene. Of these possible elastomers, the ethylene-$\alpha$-olefin copolymer is more preferable. This is a soft copolymer which is formed of ethylene with at least one $\alpha$-olefin selected from the group of $\alpha$-olefins having from 3 to 12 carbon atoms. Optionally, these two monomers may further be copolymerized with a small amount of a hydrocarbon possessing the structure of polyene such as, for example, dicyclopentadinene, 1,4-hexadiene or ethylidenenorbornene. Concrete examples of $\alpha$-olefins usable for this purpose include propylene, butene-1, hexene-1, heptene-1, 4-methyl-1-pentene, and octene-1. Of these $\alpha$-olefins, particularly desirable are propylene and butene-1. The ethylene content of the copolymer is desired to fall within the range of from 20 to 90 mol%, preferably from 40 to 90 mol%, and more preferably from 65 to 89 mol%. The most preferable range of the ethylene content is from 70 to 88 mol%.

The ethylene-$\alpha$-olefin copolymer is of nature such that the density does not exceed 0.91 g/cm$^3$. VSP (value determined by the method of ASTM D-1525 under 1 kg of load) of the polymer (B) is not more than 60° C., preferably 50° C., more preferably 40° C. Generally, the crystallinity of the polymer in the rubbery zone ranges from substantial amorphousness to low partial crystallinity of the order of not more than 30% as determined by the X-ray method. The ethylene-$\alpha$-olefin copolymer elastomr is particularly desired to be a copolymer of ethylene with propylene or butene-1. This copolymer, optionally, may contain a small amount of a compound possessing the structure of diene as another copolymerizable monomer. For example, this compound is a thermoplastic elastomer possessing MI within the range of from 0.1 to 10, preferably from 0.2 to 6, which elastomer is a random copolymer produced by a polymerization using a catalyst composed of a vanadium compound and an organic aluminum compound. This elastomer is desired to lack the blocked form which is generally possessed by ordinary unvulcanized rubber, refrain from inducing the phenomenon of cold flow, come in the form of pellets, and possess ample thermoplasticity enough to be extruded all by itself into film. A typical proprietary product that meets this requirement is "Tafmer" produced by Mitsui Petrochemical Industries, Ltd.

The polymer (C) of the blended specific polymers [1] and [3] is at least one member selected from the group consisting of IPP, HDPE, and high polymerized crystalline PB-1. This polymer (C) has relatively high rigidity and desirably VSP of not less than 100° C. IPP is the kind of IPP with high isotacticity usually available on the market. It is desired to be a homopolymer of propylene or a copolymer of propylene with not more than 7 mol% of ethylene, 1-butene or some other $\alpha$-olefin. It may be a mixture of these co-monomers.

HDPE is the kind of polyethylene which is produced by the medium- or low-pressure process and possesses a density of not less than 0.935 (g/cm$^3$) and is usually available on the market. It is desired to possess MI within the range of from 0.1 to 10, preferably from 0.2 to 7. It may embrace a copolymer of ethylene, in which case the ethylene content is desired to exceed 93 mol%, preferably 95 mol%. When MI is less than 0.1, this polymer tends to pose problems relating to compatibility and optical properties in the course of molding. When MI exceeds 10, the polymer as the basic material does not offer sufficient strength and exhibits inferior film-forming property. Of the group of members from which the polymer (C) is selected, it is preferable to use preponderantly IPP. A mixture of polypropylene with HDPE may be advantageously used instead. A rigid polymer which possesses proper degrees of compatibility and dispersibility and, therefore, fulfils the purpose of this invention may be used. When HDPE is used as the polymer (C), it is preferable to crosslink before it is drawn.

The polymer (D) of the specific polymer [4] is crystalline PB-1 which is a highly isotactic, ultra-high molecular polymer obtained by polymerizing butene-1 as a principal monomer. It may embrace a copolymer obtained by copolymerizing butene-1 with other olefinic monomer in such a way that the principal monomer, butene-1, is allowed to retain its crystallinity intact. In this copolymer, the content of butene-1 is desired to exceed 85 mol%, preferably 90 mol% and MI is desired to fall within the range of from 0.2 to 20, preferably from 0.2 to 6. The PB-1 of this type are different from polybutenes of the type which are prepared as polymers of poly-iso-butylene and are used as liquid or waxy additives of low degrees of polymerization. When PB-1 is used as the polymer (C), the PB-1 content in the blend of polymers forming the layer of cold drawable resin is desired not to exceed 50% by weight.

The polymer (E) of the specific polymer [5] is an ionically crosslinked resin which is a copolymer of ethylene and aliphatic unsaturated carboxylic acid, the carboxyl group of said copolymer being at least partially (including wholly) ionized with metal, and said ionically crosslinked resin is obtained by at least partially (including wholly) saponifying an aliphatic unsaturated alkyl carboxylate and then subjecting the product of saponification to at least partial ionic bonding with metal. Said metal is such as, for example, Na$^+$, Zn$^{++}$, Mg$^{++}$ - - - . There are cases when the specific polymer is desired to retain therein the ester bond, depending on the purpose for which the polymer is used.

The layer of cold drawable resin in the film of the present invention is substantially composed of specific polymers described above. These specific polymers [1], [2], [3], [4] and [5] may be used as mixed with other suitable polymers within the limits in which they are allowed to retain their characteristics unaffected. The content of the specific polymers in the cold drawable resin layer ought to exceed 50% by weight at all times.

Among the polymers (A), (B) and (C), therefore, the allowable combinations are [1] (B)+(A)+(C), [2] (B)+(A) and [3] (B)+(C) and the preferable mixing ratios by weight of component polymers in the combinations are such as:

$0.90 \geq B/(A+B) \geq 0.05$ and $2.0 \geq C/(A+B) \geq 0.05$ in [1]

$0.90 \geq B/(A+B) \geq 0.05$ in [2]

$0.90 \geq B/(B+C) \geq 0.30$ in [3]

and more preferably:

$0.70 \geq B/(A+B) \geq 0.07$ and $1.0 \geq C/(A+B) \geq 0.10$ [1]

$0.70 \geq B/(A+B) \geq 0.07$ [2]

$0.87 \geq B/(B+C) \geq 0.40$ [3]

and more preferably:

$0.50 \geq B/(A+B) \geq 0.08$ and $1.0 \geq C/(A+B) \geq 0.10$ [1]

$0.50 \geq B/(A+B) \geq 0.08$ [2]

If the amount of the soft polymer (B) is less than the allowable lower limit indicated above, the blend of any of the [1], [2] and [3] combinations does not easily manifest the expected synergistic effect of cold drawing property and, therefore, suffers from inferior properties. For example, the blend may be deficient in film strength, optical properties, low-temperature properties, softness, sealing property, drawability, and the like. If the amount is greater than the allowable upper limit indicated above, the produced film tends to acquire excessive flexibility, cause blocking and lose thermal resistance, sealing property and optical properties.

Among the combinations of the specific polymers indicated above, particularly desirable is the combination [1] (A)+(B)+(C). To be more specific, the polymer (C) cooperates with other components to improve synergistically the film's tensile and impact strengths, heat resistance, extrusion moldability, modulus of elasticity and heat sealing property. The improvement is especially conspicuous in heat resistance, extrusion moldability, modulus of elasticity and heat sealing property. When the content of the polymer (C) is less than the allowable lower limit, the blend suffers from considerable deficiency in film workability, unevenness of film wall thickness due to inferior flowability of the blend in the die. Further, the improvement ascriable to the polymer (C) is degraded in heat sealing property and strength properties. The heat resistance also falls short of the expected level. If the content of the polymer (C) in the blend is greater than the allowable upper limit indicated above, the blend is deficient in extrusion moldability, transparency, flexibility and impact strength. Thus, this content ought to fall within the range indicated above. Among the aforementioned group of polymers from which the polymer (A) is selected, particularly desirable is a specific ethylene type copolymer. There are cases wherein this particular copolymer is desired to form the principal component in the ternary blend of the aforementioned combination of (A)+(B)+(C).

In the absence of the polymer (B) from the aforementioned ternary blend of the combination (A)+(B)+(C), both the blendability and combatibility are not very satisfactory and the synergistic effect mentioned above cannot be expected. In the present of the polymer (B), the ternary blend no longer suffers from such deficiency.

One possible reason may be that the ethylene contained in the polymer (A), the characteristics of the polar functional group issuing from the peculiar structure thereof, and the other polymers (B) and (C) delicately interact and, at the same time, the crystalline structure of the blend, the condition of the dispersion of the component polymers in the blend, the effects of the treatment and other factors synergistically cooperate with one another.

In the case of the blend of the aforementioned combination wherein the polymer (A) forms the principal component, when the three component polymers each in the form of pellets are blended dry, then melted, kneaded and extruded into a film by use of an extruder excelling in blending capacity, a possible result of the extrusion molding is such that either inside or around the particles of the polymer (C) dispersed within the polymer (A), the polymer (B) is dispersed in a complicate pattern and allowed to react upon and interact with the polymer (C).

The condition in which such component polymers are dispersed when the blend is molded into a film and drawn for necessary orientation varies with the condition for the molding of the blend.

When the aforementioned blend is extruded at a relatively high temperature within the range of from 230° to 260° C. through a film or sheet die containing a narrow slit 1.5 mm in thickness, either under no load or under a fixed drawing ratio, and is quenched to produce a film, for example, the properties of the resulting film depend on the kind and amount of the rigid polymer (C) used in the blend. When the polymer (C) happens to contain 30% by weight of PP, for example, some portion of the PP in the polymer (C) is distributed in the principal polymer (A) to the flowing direction and the dispersed particles of PP are arranged in the form of fibers, with the result that the film acquires a structure as though reinforced with glass fibers and, therefore, manifests various strength properties at highly improved level. When the raw sheet or film is crosslinked before drawing, the characteristic structure resembling that which is reinforced with glass fibers may at times be manifested to advantage. The additional crosslinking, therefore, is no essential requirement.

In the blend of the combination (B)+(C), the thermoplastic elastomer which is particularly advantageously used as the polymer (B) is a random copolymer composed of 65 to 95 mol%, preferably 75 to 90 mol%, of ethylene, amorphous of partially low crystalline propylene and butene-1. This elastomer is available in the form of pellets.

The specific combination of polymers or the polymer (E) to be used in the specific multilayered film of the present invention is extruded in conjunction with other resins into a multilayered sheet. Then, the sheet may be activated with a high-energy ray such as electron beam (β ray), γ ray or U.V. ray so as to be modified through a crosslinking reaction. This post-treatment is desired to be effected to an effect such that the content of gel insoluble in boiling xylene falls within the range of from 0 to 50% by weight, MI does not exceed 0.5. Preferably, the content of gel is in the range of from 0.1 to 40% by weight and MI is below 0.1.

If the insoluble gel content is greater than the allowable upper limit indicated above, the product of molding suffers from degradation of elongation and strength. When this product is in the form of a film, the heat sealing property is degraded to a point where the film cannot easily be sealed or cut with a hot wire or it tends to tear. Thus, the insoluble gel content is desired to fall within the range indicated above.

The polymer (D) is a polymer composed preponderantly of crystalline PB-1 and is identical to the polymer touched upon previously in the description of the polymer (C). In the layer formed preponderantly of this PB-1, the polymer (D) is desired to be contained by not less than 50% by weight, preferably by not less than 70% by weight, and more preferably by not less than 80% up to 100% by weight.

The polymer (E), too, is desired to be contained by not less than 50% by weight.

The film of the present invention is characterized by containing at least one layer formed of specific polymers selected from the blended and unblended specific polymers [1], [2], [3], [4], and [5]. By virtue of the high cold drawability (synergistically manifested particularly when the specific polymers are used in a plurality of layers) possessed by these specific polymers, other layers formed of resins which defy cold drawing can be simultaneously drawn to a high extent. It is surprising to note that, in the film of this invention, IPP can be drawn at 32° C. as will be described afterward. The specific polymers of the present invention permit orientation to be effected to degrees normally unattainable and, therefore, give birth to the aforementioned characteristics of the present invention. It goes without saying that the multiple layers of the film of this invention can be formed solely of the specific cold drawable resins instead of being interposed by layers of other resins.

The specific polymers described above are resins which permit cold drawing and high orientation. The elastomer as the polymer (B) is contained where the polymer (D) or (E) is contained by less than 50% by weight or not contained at all. The specific combinations of polymers [1] (B)+(A)+(C), [2] (B)+(A) and [3] (B)+(C) go to manifest high capacities for cold drawing and high orientation. Of the specific polymers involved in this invention, the specific polymer of [4] (D) possesses the highest cold drawability, followed by the specific polymers [1], [2], [3], and [5]. Especially for the specific polymer [4] (D) to manifest its outstanding effect to advantage, the content of this polymer in the layer is desired to exceed 50% by weight as described above.

The resins for the other layers which may be incorporated in the film of this invention in addition to those of the specific cold drawable resins are generally selected from the group consisting of IPP, polyethylene (PE), EVA, copolymers of ethylene with aliphatic unsaturated carboxylic acids or carboxylates, and ionically crosslinked resins (Io) derived from ethylene type copolymers.

The resins unable for the $O_2$-barrier layer which may be incorporated in addition to the layers of the specific cold drawable resins are generally selected from the group consisting of compositions formed preponderantly of vinylidene chloride type copolymer (PDC), saponified polymers of ethylene-vinyl acetate copolymer, nylon type resin (Ny), and polyester type resin (PET). Where the produced film is required to possess particularly high shrink property, it is desirable to use the PDC type polymer.

Though the above specified polymers mostly function as an adhesive layer, the adhesive layer may be used additionally for adhering layers. Examples of the layers used as the adhesive layer are selected from the group consisting of EVA containing comparatively high vinyl acetate content (VAC 15–40% by weight), ethylene-α-olefine copolymer elastomers, ethylene-aliphatic unsaturated carboxylic acid copolymers and modified derivatives thereof, stereo block-copolymer of styrene-conjugated diene type monomers and thermoplastic polyurethane type polymers. The produced film is sometimes sufficient by including at least one layer possessing at least one polymer selected from the above group depending on its purpose.

As regards the thickness distribution of the component layers in the film, although the proportion of the combined thickness of the layers formed of the specific polymers [1], [2], [3], [4], and [5] to the total thickness of all the layers of the film is not specifically limited, it is nevertheless desired to exceed 20%, preferably 30%, more preferably 50% and most preferably 60%. It may be suitably fixed to suit the purpose for which the produced film is used in the particular case. Concerning the combination of component layers in the film, it is proposed for the sake of simplicity to refer to the combined specific polymers [1] (B)+(A)+(C), [2] (B)+(A) and [3] (B)+(C) collectively as SBC, to the specific polymer [4] (D) as PB, and to the specific polymer [5] (E) as Io respectively.

Examples for the two-layered films, typical combinations of component layers are as follows:
 (a) SBC/PP, SBC/Ny, SBC/EVA, SBC/Io, - - -
 (b) PB/PP, PB/Ny, PB/EVA, PB/Io, - - -

For the three-layered and other multi-layered films, typical combinations of component layers are as follows:
 (a) PP/SBC/PP, Ny/SBC/Ny, PP/SBC/Io, Io/SBC/Io, EVA/SBC/EVA, PP/SBC/EVA, - -
 (b) PP/PB/PP, Ny/PB/Ny, PP/PB/Io, EVA/PB/EVA, PP/PB/EVA, - - -

It is optional to add to these combinations the aforementioned layer of adhesive resin. These combinations are effective in improving surface hardness and sealing property, in improving modulus of film and mechanical properties for the sake of packaging, and in improving mechanical strength properties and transparency. In the case of a layer to be formed of other resin which is highly functional and costly, the thickness of the layer may be substantially decreased to the order of 0.1 to 10μ. It is shrinking to note that, in the film of the present invention, the layer of such a thin thickness can be effectively cold drawn. The proportion of the thickness of this layer is desired to fall within the range of from 0.1 to 30%, preferably from 0.1 to 20%, and more preferably from 0.1 to 10%. Even when the intermediate layer (SBC) in the three-layered film mentioned above is replaced by a layer of other resin and the aforementioned extremely thin layer of the highly functional and costly resin is incorporated, the resultant film proves highly advantageous because the component layers are allowed to manifest fully their characteristic properties such as sealing property and thermal resistance. For example, in the manufacture of a film possessing properties befitting the general shrink wrapping, particularly high strength and low-temperature high-speed shrinking property, by adoption of a highly effective combination of SBC or PB layers, incorporation of the layers of propylene type resin and PVC type resin (including a plasticizer) generally available in the market permits the produced film to enjoy the advantages derived from the two resins mentioned above. Thus, there can be obtained a film which exhibits the advantageous properties of an ordinary PP type film such as surface slipperiness, adaptability to the wrapping machine, high shrink ratio, high shrink tension, great ease of fusion cutting with a hot wire or hot blade, sealing property, and high heat seal strength and, on the other hand, shuns the disadvantages of the PP type film such as gradual loosing of film in packages with lapse of time, rupture due to excessive tension, deficient impact strength, poor tear strength, insufficient cold resistance, defective shrink wrapping property at elevated temperatures, inclination toward sudden shrinkage due to change of temperature, and limited adaptability for shrink wrapping and the like, or a film which possesses an outstanding capacity for elastic recovery and also exhibits the advantageous properties of a PVC type film such as low-temperature shrink wrapping property, flat temperature characteristics for shrinkage and favorable optical properties and, on the other hand, shuns the disadvantageous properties such as poor heat seal property (especially, said fusion sealing property), gradual degradation of properties in general with lapse of time and occurrence of noxious gases during the cutting and sealing of film and in the course of incineration of film waste. To cite a concrete example, there can be produced a cold drawn high-orientation three-layered film (15μ) of the combination of PP/PB/PP wherein the first (PP) layer has a thickness of 1.5μ, the second (PB) layer a thickness of 12μ and the third (PP) layer a thickness of 1.5μ. This film may incorporate therein an adhesive layer such as of EVA, ethylene-α-olefin copolymer or the like. In the case of this combination, incredulously a film of fair strength having an extremely small total thickness of 6μ to 7μ can be obtained as shown in a working example cited herein below. Another cold drawn high-orientation film which can be produced has a total film thickness of 15μ, consisting of the first (PP) layer of a thickness of 0.5μ, the second (SBC) layer of a thickness of 14μ and the third (PP) thickness of 0.5μ. Again this film may incorporate therein an adhesive layer such as of EVA, ethylene-α-olefin copolymer or the like.

When one layer of the aforementioned crystalline PB-1 (PB) is incorporated as an inner layer and at least one adhesive layer is further incorporated in the aforementioned films, such additional layers serve the purpose of giving stabilized drawability into the films and, at the same time, improving various properties of the films. To illustrate the synergistic effects brought about by the incorporation of such layers by citing data from the working examples given afterward, while the film cold drawn solely of SBC in Run No. 1 of Comparative Example showed 1.4% of Haze, 11.5 Kg/mm² of tensile strength, 220% of elongation, 33 Kg/mm² of modulus of elasticity, 1.1 Kg/15 mm width of heat seal strength (sealing method by fusion cutting), 60° C. as temperature for 20% shrinkage, 24 Kg.cm of dart impact strength, the three-layer film of a construction consisting of 0.5μ of PP layer, 15μ of SBC layer and 0.5μ of PP layer and produced in Run No. 20 of Example of this invention showed 0.8% of Haze, 14.1 Kg/mm² of tensile strength, 170% of elongation, 40 Kg/mm² of modulus of elasticity, 2.1 Kg/15 mm width of heat seal strength, 58° C. as temperature for 20% shrinkage and 32 Kg.cm of dart impact strength, indicating notable improvement in the various properties indicated. The improvement in modulus of elasticity and heat seal strength was particularly conspicuous despite the fact that the cold drawn PP layers each had a very thin thickness. It is also noteworthy that the film of this invention retained its low-temperature shrink property amply despite the fact that the PP layers were incorporated on the outer sides of the film. To be more specific about PB-1, the PB layer is allowed to manifest its special synergistic effect to advantage only when it is incorporated in the multi-layered film contemplated by this invention. When the PB-1 resin is drawn all by itself, the produced film suffers from totally inferior properties. When it is drawn in the multi-layered film, however, the cold drawing strength which this particular layer exhibits is greater than that exhibited by the SBC layer in most cases. More desirable results are obtained when the PB layer is incorporated as an inner layer.

To be more concrete, the outstanding synergistic effects brought about by having the PB-1 layer interposed as an inner layer in the film is evident from the following comparison: The film obtained by using PB-1 alone as in Run No. 3 of Comparative Example showed very poor physical constants such as 25% of Haze, 4.2 Kg/mm² of tensile strength, 30% of elongation (a value suggesting high susceptibility to tear), 0.35 Kg/15 mm width of heat seal strength, 83° C. as temperature for 20% shrinkage (a value suggesting lack of heat shrink property at low temperatures), 45 g/mm² of shrink tension, and 11 Kg/mm² of modulus of tensile, whereas the aforementioned three-layered film produced in Run No. 9 of Example of this invention showed highly desirable physical constants such as 0.6% of Haze, 16.5 Kg/mm² of tensile strength, 210% of elongation, 2.8 Kg/15 mm width of heat seal strength, 62° C. as temperature for 20% shrinkage (a value suggesting high heat shrink property at low temperatures), 350 g/mm² of shrink tension, and 52 Kg/mm² of modulus of tension. Despite the absence of an adhesive layer between the layers of PP and PB, an attempt to separate the two layers from each other by means of a cellophase tape ends up in failure for some unknown reason. This means that these two layers have sufficient adhesive strength. The sealing effect which they produce is much higher than when the two layers are used independently of each other. In the field shrink wrapping test, it is demonstrated that the aforementioned film of this invention possesses as high shrink properties at low temperatures as the PVC type film and also possesses the elasticity normally required of any film used satisfactory for the purpose of wrapping. Thus, this film proves quite suitable for wrapping film.

The aforementioned film of the construction consisting of the three layers of Io/SBC/Io constitutes itself an excellent shrinking film. The film as produced in Run No. 3 of Example of this invention shows highly advantageous physical constants such as 0.6% of Haze, 11.5 Kg/mm² of tensile strength, 245% of elongation, and 2.2 Kg/15 mm width of heat seal strength and also exhibits high shrinkability at low temperatures and high modulus of elasticity. After shrinkage in the longitudinal and transverse directions by an average of 60%, this film shows only 1.2% of increase in Haze compared to a large value of 3.6% shown by the film formed solely of SBC. Further, the heat seal strength at a high temperature of 80° C. which this film shows is 1.2 Kg/15 mm width, a value definitely large compared with the value of 0.2 Kg/15 mm width shown by the SBC layer.

Compared with the films obtained by the method of this invention the shrink films of vinyl chloride and polypropylene available in the market show inferior physical constants as will be dealt with afterward. Typical physical constants they show are 0.5 of and 1.9 Kg/15 mm width of heat seal strength, 66° C. and 120° C. as temperature for 20% shrinkage, and 16 and 8 Kg.cm of dart impact strength.

Now, the film possessing barrier property which constitutes one of the objects of this invention will be described. For the sake of simplicity, the barrier layer used in the film will be referred to as Br and the adhesive layer as CH. Then, possible combinations of component layers are as shown below (the component layers to be indicated in the increasing order of distance from the outermost layer).

For the two-layered films, a typical combination of component layers is SBC/Br. In this layer combination, when emphasis is placed on shrinkability of the film, the thickness ratio of SBC/Br is desired to exceed 2/1. For example, the ratio may be suitably selected in the range of from 3/1 to 6/1.

For the three-layered films, typical combinations of component layers are SBC/Br/SBC, Io/Br/SBC, Io/Br/Io, and so on.

For the four-layered films, typical combinations of component layers are as follows:

(a) SBC/CH/Br/CH/SBC, EVA/SBC/Br/SBC/EVA, Io/SBC/Br/SBC/Io, PP/SBC/Br/SBC/PP, PP/SBC/Br/SBC/Io, Ny/Io/SBC/Br/SBC, PP/CH/Br/SBC/Io, SBC/Br/SBC/CH, etc.

(b) SBC/PB/Br/SBC, SBC/PB/Br/CH, Io/SBC/PB/Br/EVA, SBC/PB/Br/PB/SBC, SBC/Br/PB/Br/SBC, PP/PB/Br/PB/PP, PP/PB/SBC/Br/SBC, Ny/Io/SBC/Br/SBC, etc.

For example, there can be produced a three-layered film of a construction consisting of the layers of SBC/PDC/SBC, namely incorporating one inner Br layer formed of PDC and two outer layers each formed of SBC. In this film, as produced in Run No. 12 of Example 4 of this invention, the layers have 14 and 6.5 and 21.5µ respectively of thickness. As will be dealt with afterward, this film exhibits outstanding properties and high barrier property (45 CC/m$^2$.day.atm. of O$_2$ permeability) and also shows high shrinkability at low temperatures.

The five-layered film of a construction consisting of the layers of Io/SBC/PDC/SBC/Io as produced in Run No. 14 of Example 4 of this invention is a particularly good shrink film possessing high barrier property.

The films of the present invention are characterized by possessing high optical properties such that the value of Haze (as determined by the method specified by ASTM D-1003-52) does not exceed 4.0%, preferably 3.0%, and more preferably 2.0%. The Haze value stated here is the standard means to be applied to films of an average thickness of 20µ. It does not apply, therefore, to films which have great thicknesses or which have been tinted, embossed or dusted.

The outstanding transparency and the high strength properties which the films of this invention exhibit are ascribable to the fact that the combinations of polymers involved can be efficiently molded with absolutely no adverse effect upon their advantageous properties derived from the quenching given in the course of sheet extrusion. It can also be ascribed to the fact that, even in the range of very low temperatures not exceeding the melting points, preferably the softening points, of the principal polymers involved, the film can be drawn very stably owing to the synergistic effects brought about by the combination of the component resins. The fact that the synergistic effects of the combination of the component polymers permit the film to be efficiently processed without entailing any structural defects such as voids may be one possible cause. The films produced solely of PP or PB as in the comparative examples can never achieve the aforementioned advantages.

The films of the present invention are further characterized by their orientation characteristics being freely varied as by modifying the manner of cold drawing, i.e. causing the film to be drawn uniaxially only in one of the longitudinal and transverse direction instead of being drawn biaxially, by subjecting the film to a heat treatment subsequently to the biaxial drawing, or by changing the combination of component polymers. It is nevertheless desirable to have the film drawn biaxially so far as the circumstance permits. The film thus produced excels in heat shrink properties and, therefore, manifests outstanding properties when used as a heat shrink film.

The fact that the temperature at which the film is allowed to undergo heat shrinking is low constitutes one of the necessary and important factors for the film to be used advantageously as a shrink wrapping film. This property is called low-temperature shrinking property. The film which has another layers composed of PET, Ny and the like and prepared by heat setting is advantageous for use which does not utilize the shrinking property of the film. When the film is tested for its thermal shrinkage at each temperatures, the low-temperature shrinkability is expressed by the value of temperature which is required for the purpose of obtaining a specific amount of shrinkage of 20% or 40% (to be expressed by an average shrinkage in the longitudinal and transverse directions). The lower the value of this temperature, the better the low-temperature shrinkability. Generally, the shrinkage which the film to be used for shrink wrapping is required to possess is not less than 20%, preferably not less than 40%. To be specific, the thermal shrinkage is obtained by a procedure of preparing a square test piece cut from a given film, inscribing a longitudinal and a transverse mark each of a specified dimension on the test piece, sprinkling the test piece with a powder such as of talc so as to repress its surface tackiness which often impedes convenience of handling, treating it with hot air of a prescribed temperature for five minutes for thereby causing the test piece to shrink, and finding changes in the longitudinal and transverse dimensions of the marks. The thermal shrinkage is expressed by the average of the longitudinal and transverse shrinkage. This thermal shrinkage is found at each temperature. The temperatures at which the film gives 20% and 40% of thermal shrinkage are reported as temperatures for shrinkages of 20% and 40% respectively.

In the case of the film of this invention to be used for shrink wrapping, the value of this temperature is low. As shown in FIG. 1 to be described afterward, the commercially available PP film for shrink wrapping has 120° C. as the temperature of 20% of shrinkage and 134° C. as that of 40% of shrinkage as indicated by the curve 5, whereas the film of this invention has 52° C. as the temperature for 20% of shrinkage and 70° C. as that of 40% of shrinkage as indicated by the curve 1. Although this value is affected secondarily by the stretching temperature and the composition, the fact that this value is on a low level constitutes one of the characteristics of the cold drawing of the present invention. If this value is high, required thermal shrinkage is not effected unless the film is exposed at a fairly high temperature for a long time at the time of this actual use. Since the magnitude of heat generated by the heater must be increased, consequently, the speed of the packaging operation is lowered. Further, there is a possibility of the heat being transferred to the commodity being packaged. Such transfer of heat proves undesirable particularly where the commodity being packaged is highly vulnerable to heat, degradable or deformable by the action of heat such as fiber or fresh food. In the case of a film whose curve of shrinkage tends to rise sharply at high temperatures, the film's shrinkage is heavily varied even by a very slight change near the shrinkage temperature at the time of packaging. When the film is loosely wrapped around a commodity in advance and the loose package is subsequently passed through a shrinkage tunnel, a slight shortage in the overall temperature of the hot air blown against the film results in insufficient shrinkage, so that the film fails to come into skintight contact with the contour of the commodity. If the temperature is slightly higher, the film is fused and sustains rupture or it is deprived of transparency and optical homogeneity.

If the value of this temperature is extremely low, the film wound up in a roll suffers a dimentional change even at normal room temperature. The commercially available PVC plasticized film to be used for shrink wrapping has 58° C. for 20% of shrinkage and 88° C. for 40% of shrinkage as indicated by the curve 4 in the graph of FIG. 1. This suggests that this film possesses desirable low-temperature shrinkability, the shrinkage property varied smoothly with the temperature.

In the case of the shrinkable film which forms one of the objects of the present invention, this value for 20% of shrinkage is generally below 85° C., preferably below 75° C. and more preferably below 70° C.

To date, no other commercially available film than the plasticized PVC film has had such desirable shrinkage property and strength.

The film which forms one of the objects of this invention has been obtained by using other resins than the PVC. It excels the PVC in terms of the responsivity to shrinkage and, in this respect, defies all comparisons. The thermal shrink tension exhibited at the time of shrinkage constitutes one of the important thermal shrinkage properties, comparable with the thermal shrinkage which is an important factor when the film is used for the purpose of shrink wrapping.

For example, even if the thermal shrinkage is high, the film fails to fit tightly to the commodity being packaged during or after the step of packaging when the tension generated in the film at the time of shrinkage is low or deviates in the direction of higher temperatures as will be described afterward. The film, then, fails to produce desired binding force and can no longer serve for the purpose of shrink wrapping.

If the value of this tension is insufficient even to the slightest extent for the purpose of producing binding force (value of shrink stress), the film is required to have its thickness increased to make up for the insufficiency. Such increase in the film thickness is uneconomical and inconvenient. Generally, this maximum value is desired to be not less than 50 g/mm$^2$, preferably not less than 80 g/mm$^2$, more preferably not less than 100 g/mm$^2$, and most preferably not less than 150 g/mm$^2$. As shown in FIG. 2, the commercially available polyethylene film for shrink wrapping has a thermal shrink tension of not more than 10 g/mm$^2$ and about 5 g/mm$^2$ as indicated by the curve 7. Thus, the film is applicable to limited uses. The film of this invention has a value of 200 g/mm$^2$ as indicated by the curve 1 in the same graph. Generally, the film of this invention has a sufficiently high value in the range of from 100 to 400 g/mm$^2$.

In the case of the low-temperature shrinkable film, this shrink tension is not significant unless it is manifested at a temperature close to the temperature corresponding to the shrinkage. The temperature-dependency curve of the shrink tension must be well balanced with the shrinkage-temperature curve (expressed by the average of the values for longitudinal and transverse directions). At times, the thermal shrink tension is desired to occur in an increased range of temperatures. In this respect, the film of the presence invention can be adjusted by properly selecting the composition and treatment.

In the present invention, the stiffness of the film can freely be adjusted in the range of from fair softness to considerable regidity by varying the combination and thickness distribution of specific polymer layers, the compositions of the resins, etc.

The film of the present invention is further characterized by processing a particularly high tensile strength. The strength at rupture, reported as the value found in the direction of drawing or in at least one of the longitudinal and transverse directions of drawing or preferably as the average of the values found in the longitudinal and transverse directions, is at least 5 Kg/mm$^2$ (as determined in accordance with the method of ASTM D-882-67), preferably not less than 7 Kg/mm$^2$. The elongation at rupture is desired to be not less than 100%, preferably not less than 150%, and more preferably not less than 200%. The dart impact strength is determined by following the method of ASTM D-1709-67 with necessary modifications. It is expressed by the value which is obtained by using a special dart whose missile head is provided with a grooved edge to facilitate rupture of the film. The film of this invention is also characterized by the fact that value of its dart impact strength is particularly high. For example, while the PVC film and the PP film have the values of 16 and 8 Kg.cm respectively, the film in the Run No. 4 has as high a value as 37 Kg.cm (as expressed on the basis of 17$\mu$ of thickness), which is comparable with the value obtained by heavy bags of LDPE 100 to 150$\mu$ in thickness available on the market. The dart impact strength is generally not less than 15 Kg.cm, preferably not less than 20 Kg.cm (as expressed on the basis of 17$\mu$ of thickness).

The fact that the tensile strength is high and the elongation is great as described above means that the film is tough and highly resistant to tear. Thus, the film proves highly advantageous for the protection of articles being packaged and permits a reduction in a film thickness.

The film of this invention possesses a strength at rupture of 16.5 Kg/mm$^2$ and an elongation of 210% as shown afterward in Run No. 9. Generally, when the strength is enhanced by orientation, the elongation of the film tends to decrease to an extreme extent. In the case of the commercial film which is formed solely of LDPE and thoroughly crosslinked (with the insoluble gel content in boiling xylene brought to 67% by weight) and consequently oriented sufficiently as described in Comparative Example (c) afterward, the strength is 6.9 Kg/mm$^2$ and the elongation is 45%, indicating that the film is highly liable to rupture. The use found for the film of this invention is not limited shrink wrapping. By virtue of its excellent toughness, it can be utilized widely as an industrial film.

By the after-treatment resorting to heat setting, the temperature for thermal shrinkage, the orientation balance in the longitudinal and lateral directions and the stabilization of the film for shrinkage can freely be adjusted so as to adapt the film of this invention for other uses or enable the film to be laminated with various other films.

Barrier layers can be made of PVDC type resin, nylon type resin, polyester type resin, resin of saponified EVA and the like. By suitable selection of the combination of resins, the number of layers and the thicknesses of individual layers, there can be advantageously manufactured a low-temperature shrinkable film bag of desired barrier property. A film suitable for use as heat-resistant retort requiring no low-temperature shrinkability can be produced, for example, by giving the film a specific heat treatment, selecting the combination of polymers or subjecting the film to heat setting. Besides, films having the properties thereof suitably modified by chemical reactions such as crosslinking, grafting, etc. can be manufactured without any specific restriction.

One preferred example of the process of this invention for the production of a film from the combination of specific polymers will be described in detail herein below.

The process of the present invention comprises thermally melting suitably selected specific polymers in each extruder, extruding the molten polymers directly through a multi-layer die or joining the molten polymers in front of a die and then extruding them through the die or extruding the molten polymers one after another into resin films so that the successive resin films are piled up one on top of another and, thereafter, suddenly solidifying a resultant multilayered sheet with a liquefied refrigerant to produce a tubular or flat raw sheet or film of sufficient uniformity. It is desirable in this case to have the individual layers of polymers simultaneously extruded to give rise to a tubular multilayered raw sheet or film. The tubular raw sheet or film thus produced may be subjected to crosslinking by means of an energy ray.

The resultant sheet or film which contains at least one layer formed of SBC, PB-1 or Io is cold drawn at a temperature within the range of from 20° to 80° C. to an area stretching ratio within the range of from 3 to 30 times. The temperature at which the sheet or film is drawn as described above is the temperature at which the drawing of the sheet is started.

Now preferred embodiments of the present invention will be described. It should be noted that the present invention is not limited to these embodiments in any way.

The extrusion is effected at an extruding temperature within the range of from 150° to 280° C. through a multi-layer annular die which is adapted effectively to avoid giving to the extruded sheet uneven wall thickness or imparting thereto heat and time hysteresis. The extruded tubular raw sheet or film is suddenly solidified by having its outer periphery uniformly cooled with a liquefied coolant to give rise to a thoroughly homogenized tubular sheet or film (in terms of both shape and inner texture). Optionally this tubular sheet or film may be pre-treated with a high-energy ray such as, for example, an electron ray, gamma ray or ultraviolet ray. The pre-treatment can be advantageously carried out by use of an electron ray having a dosage of 1 to 10 Mrads, for example. This treatment, if carried out to any excess, produces adverse effects on the various properties of the produced film.

The subsequent step of drawing is carried out either at normal room temperature or at an elevated temperature by application of heat. In this case, the temperature at which the drawing is carried out must be kept below the level at which the main crystals in the principal polymers in the sheet, preferably the main crystals in all the layers making up the sheet, are melted (which temperature is measured at the scan speed of 20° C./min. at the peak value stated in accordance with the DCS method). This is because once the crystals are melted, they are recrystallized at a temperature considerably lower than their melting point and this difference between the two temperatures increases in proportion to the speed of temperature increase or decrease, so that the sheet cannot be given practically ample cold orientation. This trend is particularly conspicuous in the case of the ionomer resin. In the case of the Na-crosslinked resin formed of ethylenemethacrylic acid copolymer having a methacrylic acid content of 5.4 mol%, MI of 1.3 and a density of 0.942 g/cm$^3$, the temperature of crystallization measured at a scan speed of 20° C./min. (while the actual film-forming speed is much higher) at times has its peak at 50° C. despite the fact that the inherent peak melting point is 100° C. The trend described above does not apply, however, where the overall degrees of crystallinity are low.

Generally in the present invention, the drawing is desired to be carried out at a very low temperature of not more than 80° C., preferably in the range of from 20° to 70° C., and more preferably in the range of from 20° to 60° C. It is further desirable that the drawing is performed below the Vicat softening points of the specific polymers used in the film. To be specific, the drawing temperature is desired to be 10° C., preferably 15° C., lower than the Vicat softening points. To enhance the properties of the film, the drawing is desired to be carried out at the lowest possible temperature that is tolerated from the standpoint of the stability of processing. When the drawing is made at a temperature exceeding the upper limit indicated above, the various properties of the film are sharply degraded and, at the same time, the stability of drawing is impaired and the uniformity of film thickness and the stability of bubble are jeopardized. Besides, the low-temperature shrinkability and the shrinkage gradient are adversely affected and various other properties such as optical properties, strength properties, elongation and resistance to pinholes (in the case of barrier layers) are seriously impaired. The inflation of the tubular sheet into a bubble in the course of drawing under application of heat is desired to be carried out with the current of air sweeping the surface layer of the bubble regulated as uniformly as permissible by adjusting the blowing of air by means of an air ring. The heating of the sheet, in this case, is desired to be kept within 20° C. above the temperature at which the drawing is started. This regulation of the temperature is imperative, because the zone of the air ring which rises to the highest temperature is suffered to swell out particularly at the start of the heat application when the temperature for the heating of the sheet is more than 20° C. above the starting temperature.

More often than not, the stretching zone through which the sheet is drawn is desired to be heated with a temperature gradient such that the temperature at the starting portion of the zone differs by at least 5° C., preferably 10° C., from that at the terminating portion.

To smoothen the drawing, the flow of the fluid medium (such as air) sweeping the surface layer of the tubular sheet being drawn is controlled by the following method. The control may be effected by some other suitable method to suit the occasion. For the purpose of establishing a suitable temperature distribution through the entire drawing zone, there are adopted contact guides whereby the drawing is carried out while the fluid being entrained by the surface of the sheet or film in motion and fluid (fluid film) on the surface of the sheet or film can be removed in the circumferential directions by virtue of the fluid's discontinuous contact with the guides. Particularly when the heating zone and the starting portion of the drawing zone are substantially isolated from each other by means of the aforementioned contact guides, the otherwise possible uneven drawing can be precluded owing to the mutual thermal interactions among the heating zone, the starting portion of the drawing zone and the cooling zone. This method can be applied similarly to the starting portion of the drawing zone, the drawing zone and the terminating portion of the drawing zone. The drawings is desired to be effected to a full extent by keeping the inner pressure of the bubble at a high level of 100 to 5000 mm $H_2O$, preferably 200 to 2000 mm $H_2O$, (as measured on the basis of a sheet 200$\mu$ in thickness and 100 mm in diameter).

As regards the extent of drawing, the area stretching ratio is desired to fall within the range of from 3 to 30 times the original dimension, preferably from 7 to 20 times the original dimension, and the transverse expansion ratio within the range of from 2 to 7 times the original dimension. More preferable ranges are 7 to 20 times for the area stretching ratio and 2 to 5 times for the transverse stretching ratio respectively. At this time, it is important that the sheet is produced with ample homogeneity as mentioned previously. If the wall thickness of the sheet involves a deviation close to or in excess of ±10%, for example, the sheet may sustain puncture and can no longer be effectively drawn. The deviation of the wall thickness of the sheet is desired to be within ±5%, preferably within ±2%. The extent of the drawing can be adjusted most advantageously by first fixing the drawing ratio in the longitudinal direction by selecting the speed ratio between the feed nip rollers and the takeup nip rollers and subsequently introducing air into the bubble and causing the bubble to inflate close to the end point of drawing (immediately preceding the point at which the sheet begins to blush) and eventually cease to inflate in the transverse direction. This is an ideal method for effecting the drawing of sheet most stably. The machine used for drawing the tubular sheet, because of the peculiar relation between the inner pressure and the diameter of the bubble, is desired to have as large a diameter as possible, generally greater than 50 mm, preferably greater than 100 mm. In due consideration of the physical properties of the film to be produced, the drawing is desired to be performed at an amply low temperature tolerated from the standpoint of the stability of the bubble. For practical purpose, it suffices to determine the extent of drawing on the basis of the composition of polymers being used, with due consideration paid to the balance with the stability of the bubble (enough to preclude possible film puncture). Owing to the small heat transfer which characterizes the process of the present invention, the total thickness of the film can be freely selected from a wide range of from a very small order of 3 to 5$\mu$ to a very large order of 100 to 150$\mu$. The generous choice of the film thickness afforded by the present invention has never been attained with any of the conventional films.

The film which is obtained by the process of this invention acquires the outstanding properties mentioned above and, more often than not, has a highly limited deviation of film thickness of the order of ±5% or even less after the step of drawing. A possible reason for this advantage is that the high inner pressure applied to bear upon the bubble imparts a strong drawing force to the film and the heat hysteresis generally involved in the course of heating and cooling is notably small and, consequently, the film enjoys high uniformity and stability. The optical properties (both Haze and gloss) of the tubular sheet appear to be quite inferior. They are notably improved, however, after the tubular sheet has undergone the treatment for cold drawing by the process of this invention. Also because of the multi-layer construction, the stability of molding of the film is notably improved as compared with the single-layer film. Thus, the process of this invention is capable of producing products of uniform and high quality.

In the present invention, the component polymers which make up the film are allowed to manifest their respective synergistic effects because they are used in the form of multiple layers in the film. None of the component polymers used in the film either brings about a drawback of the kind often experience in a similar situation or causes any degradation of strength. This advantage of the present invention is never attained by the ordinary drawing process which requires the sheet to be heated to or over its melting point. In the case of the conventional film produced by the ordinary drawing process, the drawing temperature must be elevated to have the optical properties of the film improved. Use of the elevated drawing temperature renders the desired orientation all the more difficult and tends to degrade the film strength.

The same thing also applies to the ordinary drawing process which uses a drawing temperature 5° to 10° C. more or less than the melting point. At such a drawing temperature, the optical properties of the film obtained are far from being satisfactory and, in the case of a mixed composition, the temperature conditions are such as to embrittle the tubular sheet to an intolerable extent. Thus, the film sustains puncture and fails to acquire advantageous properties in most cases. As demonstrated in the preferred embodiment of this invention cited afterward, the cold drawing aimed at by the present invention can be effectively attained at a very low temperature such as, for example, 32° C. This is an unprecedented achievement. It is never materialized unless the synergistic effects peculiar to this invention are derived from the uniform sudden cooling of the multi-layered tubular sheet including a specific layer such as of cold drawable resin and the fulfilment of the conditions essential for the specific drawing.

In the case of the single-layer film formed solely of PP, for example, the drawing is obtained continuously barely at a temperature falling within a very small range of from 140° to 160° C. under difficult and delicate conditions. At a lower temperature, the film sustains puncture and is incapable of continued drawing. At a higher temperature, there is obtained a blushed, weak film of inferior properties. With the conventional film, absolutely no effective drawing has been obtained at temperatures in the neighborhood of 80° C., let alone the extremely low temperature of 32° C. at which the film of the present invention can be drawn as described above. This outstanding cold drawability of the film of the present invention is really amazing.

Further, the properties of the film produced by this invention, including strength, optical properties, low-temperature shrinkability, seal property, tear strength and, among others, impact strength far excel those exhibited by the single-layer film. The drawing by the present invention can be effected to a level decisively higher than the level obtained by the ordinary drawing process.

The same thing applies to the film of this invention which incorporates additional layers made of resins other than the resins embraced by this invention. With the film of this invention, biaxial drawing can be accomplished at an extremely low temperature which departs far from the scope which finds general approval.

When the film is subjected to the biaxial drawing, the layers such as of SBC, PB, and Io have their drawing conditions and film properties notably improved owing to the synergistic effects produced by the interaction of the resins embraced by this invention and other resins. These layers, at times, function as adhesive layers.

When rolls of the film of this invention are put to storage in a room kept at normal room temperature, for example, there is a possibility that the rolls piled up in a heap will slip and fall down as a result of change of size in the film. With a view to preventing this trouble, the film which has been drawn may be subjected to a heat treatment while it is still on line or after it has been wound up in rolls, so that the film is stabilized dimensionally and, consequently, freed from the factor responsible for shrinkage at normal room temperature. This treatment, if performed to a suitable extent, permits free control of the aforementioned factor without impairing the other properties. This treatment also enables the orientations already set in a biaxially drawn film to be freely shifted in the longitudinal and transverse directions.

The total thickness of the raw sheet or film can freely be selected generally in the range of from 20-30$\mu$ to 2-3 mm. More practically, the range of thickness is from 50 to 1000$\mu$.

The composition and the combination of layers according to the present invention can be applied to films monoaxially drawn to a high degree. They are similarly applicable to films of low orientation which are produced by extruding the resins, inflating the extruded sheets and suddenly cooling the inflated sheets. Further, since the films using the composition and the combination of specific polymers according to this invention are readily cold drawn at normal room temperature, they can be advantageously utilized as films of high strength properties (such as, for example, tensile strength, tear resistance, impact resistance) and films excelling in heat seal property, modulus of elasticity, surface properties (hardness, freedom from smear, excessive slipperiness, frosting, etc.), heat resistance and barrier property.

Now the film and the process for the manufacture of the film according to the present invention will be described specifically with reference to working examples of the invention. It should be noted that this invention is not limited to these examples.

EXAMPLE 1

60% by weight of EVA ($a_1$) [the vinylacetate content (VAC) 10% by weight=(3.5 mol%), the melt index (MI) 1.0, the Vicat softening point (VSP) 75° C., the crystal melting point (MP) 95° C.] and 15% by weight of the ethylene-$\alpha$-olefin copolymer elastomer ($b_1$) ($\alpha$-olefin is propylene, said copolymer was obtained by the random copolymerization of 18 mol% of propylene and 2% by weight of ethylidine norbornene) having MI of 0.45, VSP of not more than 40° C. and the density of 0.88 g/cm$^3$ were mixed with 25% by weight of IPP ($C_1$) [the melt flow rate (MFR) of 2.0, the density of 0.88 g/cm$^3$, said IPP copolymer comprises 3% by weight of ethylene] having VSP of 143° C. and MP of 155° C. in the blender to produce the mixed resin composition as the resin for the SBC$_{111}$ layer use. And then the ionically crosslinked resin (Ionomer) ($E_1$) (said resin was manufactured by 30% neutralizing the saponified polymer of the ethylene-methyl methacrylate copolymer in the presence of Na$^+$ion, the methacrylic acid content 20% by weight) having MI of 1.0, VSP of 62° C. and MP of 83° C. was used as the Io layer. Said mixed resin composition and said ionically crosslinked resin ($E_1$) were mixed at the maximum temperature of the cylinder part of 240° C. by each two of the extruders having 40 mm in diameter provided with the screw having the ratio (L/D) of 33 respectively to produce the plasticized kneading compositions and said compositions were co-extruded from two sorts of three layered annular die 100 mm in diameter having the slit of 2.5 mm. Then the extruded product was quenched at the position which was about 10 cm distance from the lip of the die by the water-cooling ring from which water of 8° C. was uniformly flowed out.

Thus there was obtained the raw tubular film 100 mm in diameter, and having the first layer (the outer layer) of the Io layer, the second layer of the SBC$_{111}$ layer and the third layer of the Io layer in thickness as shown in Table 1.

The raw tubular film was passed between the two pairs of the delivery nip rolls and the draw nip rolls which rotate faster than the delivery nip rolls respectively, while passing said rolls, the raw tubular film was heated to the temperature of 37° C. by the hot air and then was continuously inflated by blowing air into the tubular film and stretched by 3.0 times in the longitudinal direction and 3.5 times of the transverse direction with good stability.

The cold air of 12° C. was blown to the film from the air ring apparatus at the end of the stretching step to cool the film. The film was folded up by the deflator and then taken up by the nip rolls and serarated to the two sheets of film by slitting the edges of the film in the longitudinal direction. Each of which was wound up under the certain tension and the films having the predetermined thickness were obtained. In order to highly stretching the film smoothly, the contacting guide for conditioning the flow of the film was used for the purpose of substantially separating the heating part and the beginning part of the stretching step thereby discontinuously contacting with the surface of the raw film and the stretching film and removing in the circumference direction, the fluid being entrained by the surface and fluid on the surface of the film which were accompanied with the raw film and the stretched film on the surface thereof. And then while stretching, said contacting guide was also used in the bubble part whereby the individual temperature controled rooms were substantially formed. Thus while elongating and stretching the film, said temperature controlled rooms were stepwisely formed on the surface of film thereby making it possible to stretch with high stability by zone-controlling. Table 2 showed the characteristic properties of the resulted film in comparison with those of the commercial three sorts of the shrink films.

TABLE 1

| Combination in thickness of raw film | Run No. | | | | | | (Comparative Example) | |
|---|---|---|---|---|---|---|---|---|
| | 1 | 2 | 3 | 4 | 5 | 6 | 1 | 2 |
| First layer (μ) | 50 | 5 | 15 | 6 | 20 | 50 | — | 150 |
| Second layer (μ) | 50 | 120 | 170 | 188 | 460 | 600 | 200 | — |
| Third layer (μ) | 50 | 5 | 15 | 6 | 20 | 50 | — | — |
| Total thickness (μ) | 150 | 130 | 200 | 200 | 500 | 700 | 200 | 150 |

TABLE 2

| Characteristics | Run No. | | | | | | (Comparative Example) | | (Comparative Example) | | |
|---|---|---|---|---|---|---|---|---|---|---|---|
| | 1 | 2 | 3 | 4 | 5 | 6 | 1 | 2 | a | b | c |
| Haze (%) | 0.5 | 0.6 | 0.6 | 0.5 | 0.7 | 0.8 | 1.4 | 0.9 | 1.7 | 2.8 | 2.5 |
| Gloss | 150 | 165 | 155 | 160 | 155 | 150 | 130 | 153 | 123 | 105 | 103 |
| Thermal property | | | | | | | | | | | |
| 20% shrinkage temperature (°C.) | 52 | 55 | 53 | 55 | 54 | 55 | 60 | 51 | 58 | 120 | 100 |
| Maximum shrinkage (%) | 76 | 77 | 75 | 78 | 77 | 76 | 74 | 64 | 57 | 72 | 76 |
| Shrink tension (g/mm$^2$) | 200 | 210 | 220 | 215 | 230 | 235 | 200 | 145 | 97 | 209 | 150 |
| Tensile strength (Kg/mm$^2$) | 12.0 | 12.5 | 11.5 | 13.5 | 13.0 | 12.5 | 11.5 | 9.5 | 6.0 | 12.0 | 6.9 |
| Tensile elongation (%) | 200 | 250 | 245 | 235 | 215 | 240 | 220 | 180 | 140 | 110 | 45 |
| Modulus of elasticity on tensile (Kg/mm$^2$) | 41 | 38 | 36 | 40 | 38 | 36 | 33 | 30 | 32 | 80 | 40 |
| Dart impact strength (Kg · cm) | 30 | 29 | 35 | 37 | 34 | 35 | 24 | 14 | 16 | 8 | 8 |
| Heat seal strength (Kg/15 mm width) | 1.1 | 1.8 | 2.2 | 1.9 | 4.1 | 5.5 | 1.1 | 1.5 | 0.5 | 1.9 | (0.3) |
| Film thickness (μ) | 15 | 12 | 19 | 18.5 | 47 | 67 | 17 | 22 | 15 | 15 | 17 |

Note:
Gloss was measured in accordance with ASTM 2454-65T. Heat seal strength was measured using the sample which was sealed by the commercial melt-cutting type heat-sealer. Modulus of elasticity on tensile was the value changing the modulus at 2% elongation into that at 100% elongation and measured in accordance with ASTMD 882-67.
The comparative sample (a) is commercial PVC shrink film.
The comparative sample (b) is commercial PP shrink film.
The comparative sample (c) is commercial crosslinked polyethylene shrink film (gel content 67%).

Run Nos. 1-6 were stretched with good stability without observing any sway of the bubbles. Stretching was carried out without accompanying any problem. The comparative sample Run Nos. 1 and 2 were the single layer film to be stretched. When stretching the film, the bubble sustained puncture two times in an hour in the sample Run No. 1, and four to five times in the sample Run No. 2 and the bubble was apt to sway and also the stretching was apt to stop in the low stretching ratio.

The obtained films had the good characteristic properties and were superior to those of the comparative films (a), (b) and (c).

Comparing 20% shrinkage temperature, the comparative PVC film (a) had low temperature and the comparative PP film (b) had high temperature of 120° C., while the film of the present invention had the temperature of 52°-55° C. and had the characteristic property like or over that of the PVC film and also was superior to the comparative PVC film (a) in the shrink tension, the tensile strength, especially the heat seal strength and the impact strength.

In the practical test of wrapping four cucumbers, wrapping was carried out by passing the wrapping film Run No. 2 for 2 seconds through the conventional tunnel oven which blew the hot air of 90° C. to the cucumbers thereby obtaining the good wrapping finish tightly fitted with the cucumbers and not having any wrinkle and not depressing good optical property after shrinkage. From the test result, it was found to be able to smoothly carry out good wrapping at the broader range of the heating time with the broader speed range from the low temperature side.

While, the commercial shrink film of polypropylene did not almost shrink at 90° C. in 10 seconds and remained the wrinkle on the sample, the satisfactory shrinking could not be accomplished without the high shrinkage temperature of 170° C. in 5 seconds under the same condition as mentioned above. Even if the heating temperature was further raised and the staying time was prolonged, the wrapping film was broken due to pitting and became opaque. The optimum shrinkage temperature range of the film was very narrow. The commercial shrink film of PVC had lack of the shrinkage and remained the wrinkle under the same wrapping condition as mentioned above. Therefore, the shrinkage temperature of 150° C. in 5 seconds was required. The shrinkage rate of the film of the present invention was especially fast and could be wrapped within one second.

The shrink film of the commercial crosslinked polyethylene was not suitable as the wrapping film since it could not shrink without the high temperature of 170° C., so that the good wrapping finish was not obtained. The film was easy to break at the sealed part and moreover, was apt to occur much breakage, the good wrapping range of the film was judged from the shrinkage, the binding force, the hole at the sealing part, the rupture from the air vent part and the devitrification phenomenon of the film after wrapping. Furthermore, judging from the good wrapping finish, the film of the present invention was the best one.

And, in order to examine the shrinkage rate or speed of the film of the present invention, the film of the present invention and those of the comparative samples (a), (b) and (c) were entered into the air oven which was controlled to the various temperatures and then the interrelationship between the temperature and the time was examined when said films reached to 40% shrinkage. From the test result, said interrelationship was 2 seconds at 90° C. in the film of the present invention, 2 seconds at 170° C. in the comparative sample (a), 2 seconds at 200° C. in the comparative sample (b), and 2 seconds at 180° C. in the comparative sample (c) respectively. It was found that the film of the present invention had the good shrinkage speed. After shrinkage, the change of the optical property about the films of present invention and the comparative samples were examined. The test result at 40% shrinkage showed that the films of the present invention Run No. 2, the comparative sample Run Nos. 1, 2, (a), (b) and (c) had the Haze of 0.8, 2.8, 3.0, 1.8, 3.1 and 4.9% respectively, and that the film of the present invention had the most superior optical property. The gloss of said films [except the sample (c)] were 160, 100, 128, 110 and 87 respectively. After shrinkage, the depression of gloss was few. The sealing strength of the film of the present invention was strong in spite of the thin film and was apt to be stronger than the single layer films of the comparative samples Nos. 1 and 2 respectively. The sealing strength of the PVC film of the comparative sample (a) was low of 0.5 kg/15 mm width. Said sample generated gas with the bad odor and remained the darkish cinders in the sealing part when heat-sealed, and formed the unstable sealing, while in the comparative sample (c), the heat-sealing could not be smoothly carried out owing to the high crosslinkage and the good cut was not obtained.

The sealing strength of the films of the present invention Run No. 2 and the comparative samples Run Nos. 1, 2, (a), and (b) at the temperature of 80° C. was 0.6, 0.12, 0.17, 0.04 and 1.1 kg/15 mm width respectively, (in the practical wrapping, the sealing temperature is more than 80° C.).

The film of the present invention Run No. 3 had the broader range of the optimum wrapping temperature than that of the comparative samples Run Nos. 1 and 2. Especially, the film of the comparative sample Run No. 2 was devitrification when passing it through the tunnel oven of 140° C. for 6 seconds and had lost the shrink tension whereby the film got loose, while the film of the present invention Run No. 3 had good heat resisting property and was not observed such phenomenon as mentioned above.

Hereafter, the strength, the elongation and the heat-shrinking property of the film were shown by the mean value between those of the longitudinal and transverse directions since said characters of the film had in the longitudinal and transverse directions in good balance.

EXAMPLE 2

The raw tubular three layer film was manufactured under the process of Example 1 using the middle layer (the 2nd layer) of the crystalline PB-1 ($d_1$) (MI 1.0, the density of 0.905 g/cm$^3$, the butene-1 unit content 96 mol %, VSP 108° C. and MP 135° C.) and the inner and outer layers (the first and the third layers) of IPP ($C_2$) (MFR 6.0, the ethylene content 5% by weight, the density of 0.88 g/cm$^3$, VSP 145° C. and MP 150° C.) in the composite ratio of Table 3.

This film was heated and stretched under the condition of Example 1 at the temperature of 30° C. The result was shown in Table 4.

TABLE 3

| Combination in thickness of raw film | Run No. | | | | | (Comparative Example) | |
|---|---|---|---|---|---|---|---|
| | 7 | 8 | 9 | 10 | 11 | 3 | 4 |
| First layer (μ) | 5 | 15 | 30 | 50 | 50 | — | 100 |
| Second layer (μ) | 70 | 170 | 140 | 100 | 400 | 200 | — |
| Third layer (μ) | 5 | 15 | 30 | 50 | 50 | — | — |
| Total thickness (μ) | 80 | 200 | 200 | 200 | 500 | 200 | 100 |

From the result, it was found that the stretching could be smoothly carried out on the films of the present invention (Run No. 7-11). While the film of the comparative sample Run No. 4 could not be stretched or blown up at all and sustained puncture. In the comparative film Run No. 3, the inflation stopped at the ratio of 1.9 times in the transverse direction and when the inflation was proceeded, the film sustained puncture and also was unstable and showed bad sizing in the inflation step.

TABLE 4

| Characteristics | Run No. | | | | | (Comparative Example) | |
|---|---|---|---|---|---|---|---|
| | 7 | 8 | 9 | 10 | 11 | 3 | 4 |
| Haze (%) | 0.5 | 0.8 | 0.6 | 1.1 | 1.4 | 25 | — |
| Gloss | 155 | 150 | 152 | 140 | 138 | 30 | — |
| Thermal property | | | | | | | |
| 20% shrinkage temperature (°C.) | 54 | 57 | 62 | 65 | 58 | 83 | — |
| Maximum shrinkage (%) | 83 | 82 | 83 | 78 | 76 | 67 | — |
| Shrink tension (g/mm$^2$) | 240 | 260 | 350 | 280 | 260 | 45 | — |
| Tensile strength (Kg/mm$^2$) | 12.7 | 14.5 | 16.5 | 13.5 | 12.5 | 4.2 | — |
| Tensile elongation (%) | 160 | 170 | 210 | 180 | 190 | 30 | — |
| Modulus of elasticity on tensile (Kg/mm$^2$) | 35 | 42 | 52 | 65 | 34 | 11 | — |
| Dart impact strength (Kg · cm) | 32 | 38 | 42 | 28 | 26 | 14 | — |
| Heat seal strength (Kg/15 mm width) | 1.8 | 2.6 | 2.8 | 2.7 | 3.9 | 0.35 | — |
| Film thickness (μ) | 7 | 16 | 18 | 20 | 46 | 30 | — |

The films of the present invention Run Nos. 7-11 were remarkably good in the optical property and strength. The thin film of Run No. 7 was soft and difficult to break in comparison with the commercial PP single film (b) 15μ in thickness. The film of the present invention had the hard surface and was difficult to injure. The film of Run No. 8 had good shrinking and wrapping finish without occuring any wrinkle on the finishing surface under the wrapping condition of 100° C., 2 seconds when the wrapping was carried out according to the wrapping operation of Example 1.

The sealing strength of the films Run Nos. 7-11 at 80° C. showed superior values of 1.0, 1.2, 1.5, 1.9 and 2.5 kg/15 mm width respectively.

The raw film having the composition and combination as shown in Run No. 8 was stretched at the stretching temperature of 88° C. but it could not be stretched due to causing breakage of the film at fast stage. At the stretching temperature of 140° C., the film was somewhat inflated and immediately after the inflation, the film sustained puncture. The said film had good and stable properties at the low temperature range and become whitish on the surface of the film as the temperature increases and also was apt to depress the low temperature shrink property and the strength of the film. This phenomenon was deduced to be based on the depression of the cold stretching property of the PB-1 ($d_1$) film and the loss of the synergistic effect between the surface layer of the film (PP) and the middle layer of ($d_1$).

At the low temperature at which the film of the present invention could be stretched, the PP single layer film of the comparative sample Run No. 4 could not be stretched since it sustained puncture at the beginning of the inflation. It could be stretched with difficulty at the temperature of 145° C. in the unstable state while maintaining the delicate balance. However, this film had the same character to that of the commercial shrink film. When the stretching temperature was raised to 160°–170° C., the stretchability became better but the obtained film became whitish and had the weak strength, while the film of the present invention had good low temperature shrinkage and did not show such the phenomenon as mentioned above.

In the film of the comparative sample Run No. 3, the PB-1 layer was in the rubber like state for 6–7 minutes immediately after stretching and quenching the film and could be relatively easily stretched. But this film became whitish at the surface of film and had the considerably inferior properties in the low temperature shrinkage, the elongation and the strength. However, it was found that the good highly oriented film was manufactured when the PB-1 film was combined with the another layer and then stretched. This was the surprising fact, especially, the said combination was enable to obtain the highly oriented film from the resin layer which can not be stretched at such the low temperature as mentioned in the present invention whereby the film having good strength was obtained. This characteristic property was apt to disappear when the PB-1 layer was combinated with another resins layer except those of the present invention. The PB-1 layer was necessary to be demanded in the amount of more than 50% by weight. In case that the combination was for example the PP layer of 53% by weight, the PB-1 layer of 33% by weight and the isotactic PP layer of 14% by weight instead of the second layer of the PB-1 layer of the sample Run No. 9, it was impossible to carry out the low temperature stretching.

EXAMPLE 3

The raw tubular film was manufactured according to the process of Example 1, using the ionically cross-linked resin (Ionomer) ($E_2$) (The resin was manufactured by the 30% nutralization of the 60% saponified polymer of ethylenemethylmethacrylate, the methacrylic acid unit content 18% by weight, MI 1.0, VSP 68° C. and MP 86° C.) as the Io layer, and the EVA ($a_2$) (the EAC content 18% by weight (6.7 mol%), MI 1.0, VSP 63° C. and MP 82° C.) as the inner and outer layer. The raw tubular film had the combination of Io/EVA/Io layers 50/80/50μ in thickness. This film was stretched at the temperature of 45° C. The stretching was smoothly carried out. The characteristic properties of the film as shown in Tables 2 and 4 were 0.5%, 152, 50° C., 73%, 170 g/mm², 10.5 kg/mm², 240%, 22 kg/mm², 29 kg.cm, 1.9 kg/15 mm width and 17μ in order.

EXAMPLE 4

The raw tubular film was manufactured according to the process of Example 1 under the operating condition of Table 5 optionally and additionally using one of the extruder (the extruder for the vinylidene polymer use having 35 mm in diameter and the ratio (L/D) of 22) and furthermore one of said extruder in the total of four extruders and also optionally using the two sort and three layer die, the three sort and three layer die, the three sort and five layer die, and the four sort and five layer die respectively.

Each of the raw film was stretched at the temperature of 35° C., 36° C., 42° C., 40° C., 45° C., 32° C., 50° C. and 36° C. respectively according to the process of Example 1. The stretching was smoothly accomplished on the all films. The film of Run No. 19 was not contained the dusting inhibitor in the film and the blocking inhibitor in the inner layer of resin in the manufacture of the raw tubular film respectively and was stretched and wound up the roll and then was carried out the brocking in the inner side of the raw tubular film to obtain the double layer film. Therefore, the film of Run No. 19 was the ten layer film. The films other than that of Run No. 19 were the tubular type bag.

TABLE 5

| Combination of thickness of raw film | Run No. | | | | | | | |
|---|---|---|---|---|---|---|---|---|
| | 12 | 13 | 14 | 15 | 16 | 17 | 18 | 19 |
| First layer (μ) | $SBC_{111}$ 150 | $EVA(a_1)$ 50 | $Io(E_2)$ 50 | $Io(E_2)$ 120 | $Io(E_1)$ + $Ny_2$ *130 | $PP(C_2)$ 50 | $NY_2$ 50 | $Io(E_1)$ 60 |
| Second layer (μ) | PDC-1 70 | $SBC_{211}$ 200 | $SBC_{242}$ 190 | PDC-2 80 | $CH_1$ 50 | $PB-1(d_2) + a_2$ **190 | $Io(E_1)$ 120 | $SBC_{11}$ 50 |
| Third layer (μ) | $SBC_{111}$ 230 | PDC-2 100 | PDC-3 60 | $Io(E_2)$ 300 | PDC-1 100 | PDC-2 80 | $CH_2$ 50 | PDC-1 50 |
| Fourth layer (μ) | — | $SBC_{211}$ 200 | $SBC_{242}$ 200 | — | $CH_1$ 50 | $PB-1(d_2) + a_2$ **190 | PDC-1 80 | $SBC_{11}$ 50 |
| Fifth layer (μ) | — | $EVA(a_1)$ 100 | $Io(E_2)$ 100 | — | $Io(E_1)$ 100 | $PP(c_2)$ 50 | $SBC_{321}$ 150 | $EVA(a_2)$ 40 |

TABLE 5-continued

| Combination of | Run No. | | | | | | | |
|---|---|---|---|---|---|---|---|---|
| thickness of raw film | 12 | 13 | 14 | 15 | 16 | 17 | 18 | 19 |
| Total thickness ($\mu$) | 450 | 650 | 600 | 500 | 430 | 560 | 450 | 250 |

Note:
*Io/Ny$_2$ = The blended resin having the weight ratio of 70/30
**PB-1/a$_2$ = The blended resin having the weight ratio of 80/20

The sort of resin:
SBC$_{11}$: 80% by weight of EVA(a$_1$) and 20% by weight of the thermoplastic ethylene-α-olefin elastomer (b$_1$).
SBC$_{211}$: 70% by weight of EVA(a$_2$) and 15% by weight of the thermoplastic ethylene-α-olefin elastomer (b$_1$) and 15% by weight of PP (c$_1$).
SBC$_{242}$: 70% by weight of EVA(a$_2$) and 15% by weight of the thermoplastic styrene-butadiene block copolymer elastomer (b$_4$) and 15% by weight of PP(c$_2$).
SBC$_{321}$: 60% by weight of EEA(Ethylene-ethylacrylate copolymer, the acrylic acid unit content 13% by weight, MI 1.5, VSP 70° C., MP 89° C.) (a$_3$) and 20% by weight of the thermoplastic ethylene-α-olefin elastomer (b$_2$) (α-olefin is butene-1, the butene-1 unit content 13 mol%, said polymer is the random polymer, MI 2.0, VSP 52° C., the density of 0.88 g/cm$^3$).
PB-1(d$_2$): The crystalline polybutene-1 (MI 2.0, the density of 0.910 g/cm$^3$, the butene-1 unit content 94 mol%, said polymer is modified by ethylene. VSP 105° C., MP 110° C.)
PB-1(d$_3$): The crystalline polybutene-1 (MI 1.0, the density of 0.915 g/cm$^3$, VSP 113° C., MP 120° C.)
PDC-1: The vinylidene chloride-vinyl chloride copolymer (the vinyl chloride unit content 15% by weight, the plasticizer and the stabilizer content 2% by weight)
PDC-2: The vinylidene chloride-vinylchloride copolymer (the vinylchloride unit content 20% by weight and the plasticizer and the stabilizer content 1.5% by weight)
PDC-3: The vinylidene chloride-methacrylic acid copolymer (the methacrylate unit content 15% by weight)
CH$_1$: The ethylene-acrylic acid copolymer.
CH$_2$: The thermoplastic styrene-butadiene block copolymer elastomer (b$_4$).
Ny$_2$: The nylon 6–66 copolymer.
Ny$_1$: The nylon 6–10 copolymer.

TABLE 6

| Characteristics | Run No. | | | | | | | | (Comparative Example) | |
|---|---|---|---|---|---|---|---|---|---|---|
| | 12 | 13 | 14 | 15 | 16 | 17 | 18 | 19 | d | e |
| Haze (%) | 1.5 | 1.0 | 2.1 | 0.8 | 1.7 | 2.2 | 1.6 | 2.1 | 7.6 | 8.0 |
| Gloss | 150 | 160 | 155 | 152 | 145 | 151 | 142 | 158 | 61 | 52 |
| Thermal property | | | | | | | | | | |
| 20% shrinkage temperature (°C.) | 58 | 56 | 57 | 60 | 61 | 63 | 65 | 60 | 74 | 77 |
| 80° C. shrinkage percentage (%) | 55 | 52 | 48 | 47 | 45 | 40 | 38 | 49 | 27 | 22 |
| Maximum shrinkage % | 75 | 74 | 77 | 72 | 74 | 73 | 75 | 74 | 60 | 52 |
| Shrink tension (g/mm$^2$) | 240 | 210 | 220 | 230 | 235 | 245 | 210 | 200 | 130 | 80 |
| Tensile strength (Kg/mm$^2$) | 12.8 | 11.5 | 12.0 | 12.5 | 14.5 | 13.1 | 13.5 | 12.0 | 6.5 | 4.9 |
| Tensile elongation (%) | 220 | 240 | 210 | 200 | 205 | 225 | 215 | 230 | 190 | 200 |
| Modulus of elasticity on tensile (Kg/mm$^2$) | 25 | 19 | 27 | 22 | 35 | 40 | 37 | 35 | 20 | 27 |
| Bar-type heat sealing strength (Kg/15 mm width) | 3.9 | 4.2 | 3.8 | 4.7 | 4.1 | 3.7 | 3.8 | 3.9 | 2.1 | 2.0 |
| O$_2$ permeability (cc/m$^2$ · day · atm) | 45 | 40 | 20 | 42 | 40 | 47 | 31 | 19 | 47 | 56 |
| Film thickness ($\mu$) | 42 | 58 | 55 | 45 | 40 | 51 | 41 | 44 | 71 | 69 |

Note:
The comparative sample (d) is the shrink bag for wrapping the raw meat, it comprises the barrier layer of vinylidene chloride of about 10$\mu$ in thickness and EVA layer [the vinylacetate unit content 15% by weight, said layer is crosslinked with the radiation of energy ray (the gel content: 72% by weight)] having 46$\mu$ in thickness as the inner layer and the EVA layer (the VAC unit content 15% by weight) having 15$\mu$ in thickness, these layers are stretched at 97° C.
The comparative sample (e) comprises the EVA layer (the VAC unit content 15% by weight), the PDC$_1$ layer, the EVA layer (the VAC unit content 18% by weight) and the ionomer (E$_1$) layer having 19/10/5/35$\mu$ in thickness respectively. This four layer film was stretched at 92° C.

The drawing films of Run Nos. 12–19 had the high dart impact strength of more than 90 kg.cm, while the comparative samples (d) and (e) had 39 and 38 Kg.cm respectively.

Each of the sample Run Nos. of the present invention was remarkably good in the optical property, the low temperature shrink property, the shrink tension, the tensile strength, the impact strength, the sealing strength, and the barrier property in comparison with the commercial wrapping film (d). The practical wrapping test was carried out by wrapping 10 Kg of the raw meat under vacuum and then passing it in the shower of hot water of 85° C. for 3 seconds thereby obtaining the good wrapping finish tightly fitted with goods which was superior in the storage life.

The gas (O$_2$) barrier property was measured after bending the comparative film (d) by hand so as to form the wrinkle on the surface of the film. From the test result, the pinhole was formed and the gas barrier property was depressed to 95 cc/m$^2$. day.atm. In the comparative film (e), the said value was remarkably depressed to 120 cc/m$^2$.day.atm. While in the film of Run No. 16, the said phenomenon was not observed.

EXAMPLE 5

The raw tubular film was manufactured using the various sort of polymers and the combination of layers under the condition of Table 7 according to the process of Example 4.

under the condition of Table 9 according to the procedure of Example 5.

TABLE 9

| Combination in Thickness of raw film | Run No. | | | | |
|---|---|---|---|---|---|
| | 29 | 30 | 31 | 32 | 33 |
| First layer (μ) | PB-1(d$_1$) 140 | EVA(a$_1$) 20 | EVA(a$_1$) 10 | Ny-1 30 | EVA(a$_1$) 20 |
| Second layer (μ) | EVA(a$_1$) 60 | PB-1(d$_1$) 160 | EVA(a$_2$) 5 | PB-1(d$_2$) 110 | PB-1(d$_1$) 130 |
| Third layer (μ) | — | EVA(a$_1$) 20 | PB-1(d$_3$) 130 | Io(E$_1$) 30 | Io(E$_2$) 50 |
| Fourth layer (μ) | — | — | EVA(a$_2$) 5 | Ny-1 30 | |
| Fifth layer (μ) | — | — | EVA(a$_1$) 30 | | |
| Total thickness (μ) | 200 | 200 | 180 | 200 | 200 |

The stretching was carried out at the temperature of 35° C., 40° C., 32° C., 45° C. and 38° C. in the films Run Nos. 29–33 respectively. The stretching was carried out stably and the characteristic properties of the resulted films were shown in Table 10.

TABLE 7

| Combination in thickness of raw film | Run No. | | | | | | | | |
|---|---|---|---|---|---|---|---|---|---|
| | 20 | 21 | 22 | 23 | 24 | 25 | 26 | 27* | 28** |
| First layer (μ) | PP(c$_1$) 6 | Ny$_2$ 6 | PP(c$_1$) 10 | PP(c$_1$) 10 | PET$_1$ 5 | PP(c$_1$) 10 | PP(c$_1$) 5 | PP(c$_1$) 10 | PP(c$_1$) 5 |
| Second layer (μ) | SBC$_{11}$ 188 | SBC$_{211}$ 180 | SBC$_{211}$ 180 | SBC$_{321}$ 180 | PB$_1$ 20 | PB$_1$ 40 | SBC$_{011}$ 190 | SBC$_{111}$ 180 | SBC$_{113}$ 140 |
| Third layer (μ) | PP(c$_1$) 6 | Ny$_2$ 6 | PP(c$_1$) 10 | PP(c$_1$) 10 | SBC$_{211}$ 150 | SBC$_{411-2}$ 100 | PP(c$_1$) 5 | PP(c$_1$) 10 | PB$_1$ 50 |
| Fourth layer (μ) | — | — | — | — | PB$_1$ 20 | PB$_1$ 40 | — | — | PP(c$_1$) 5 |
| Fifth layer (μ) | — | — | — | — | PET$_1$ 5 | PP(c$_1$) 10 | — | — | — |
| Total thickness (μ) | 200 | 192 | 200 | 200 | 200 | 200 | 200 | 200 | 200 |

Note
*The film was treated with the radiation of the high energy ray of 7 Mrad. The gel content of the SBC layer was 7% by weight.
**The film was treated with the radiation of the high energy ray of 10 Mrad. The gel content of the SBC layer was 38% by weight.

The stretching was carried out at the temperatures of 35° C., 48° C., 36° C. and 38° C. in the films of Run Nos. 20–23 respectively, while at the temperatures of 50° C., 35° C., 32° C., 33° C. and 35° C. in the films of Run Nos. 24–28 respectively.

The resulted films had good properties as shown in the Table 8.

TABLE 8

| Characteristics | Run No. | | | | | | | | |
|---|---|---|---|---|---|---|---|---|---|
| | 20 | 21 | 22 | 23 | 24 | 25 | 26 | 27 | 28 |
| Haze (%) | 0.8 | 0.5 | 0.7 | 0.7 | 0.6 | 0.8 | 0.7 | 0.8 | 1.0 |
| Thermal property | | | | | | | | | |
| 20% shrinkage temperature (°C.) | 58 | 64 | 56 | 60 | 72 | 55 | 58 | 59 | 57 |
| Maximum shrinkage (%) | 75 | 71 | 78 | 76 | 70 | 76 | 75 | 81 | 82 |
| Shrink tension (g/mm$^2$) | 220 | 180 | 240 | 215 | 220 | 210 | 165 | 260 | 250 |
| Tensile strength (Kg/mm$^2$) | 14.1 | 15.2 | 14.1 | 13.8 | 16.2 | 13.8 | 11.9 | 13.2 | 17.0 |
| Tensile elongation (%) | 170 | 150 | 200 | 165 | 180 | 210 | 200 | 165 | 150 |
| Modulus of elasticity on tensile (Kg/mm$^2$) | 40 | 50 | 37 | 46 | 49 | 40 | 36 | 48 | 42 |
| Dart impact strength (Kg · cm) | 32 | 45 | 33 | 35 | 40 | 47 | 34 | 41 | 49 |
| Heat seal strength (Kg/15 mm width) | 2.1 | — | 2.1 | 2.5 | — | 2.2 | 2.1 | 2.4 | 2.0 |
| Film thickness (μ) | 16 | 17 | 17 | 16 | 16 | 16 | 16 | 15 | 15 |

EXAMPLE 6

The raw tubular film was manufactured using the various sort of polymers and the combination of layers

TABLE 10

| Characteristics | Run No. | | | | |
|---|---|---|---|---|---|
| | 29 | 30 | 31 | 32 | 33 |
| Haze (%) | 2.4 | 0.9 | 0.5 | 0.5 | 1.1 |
| Thermal property | | | | | |
| 20% shrinkage temperature (°C.) | 56 | 58 | 53 | 65 | 55 |
| Maximum shrinkage (%) | 80 | 83 | 82 | 80 | 78 |
| Shrink tension (g/mm$^2$) | 200 | 290 | 320 | 270 | 260 |
| Tensile strength (Kg/mm$^2$) | 12.1 | 13.5 | 15.1 | 14.7 | 12.1 |
| Tensile elongation (%) | 145 | 165 | 200 | 175 | 125 |

TABLE 10-continued

| Characteristics | Run No. | | | | |
|---|---|---|---|---|---|
| | 29 | 30 | 31 | 32 | 33 |
| Dart impact strength (Kg · cm) | 27 | 32 | 45 | 40 | 34 |
| Heat seal strength (Kg/15 mm width) | 2.2 | 2.3 | 2.1 | 1.7 | 2.4 |
| Film thickness ($\mu$) | 18 | 18 | 15 | 20 | 18 |

EXAMPLE 7

The raw tubular film was manufactured using the various sort of polymers and the combination of layers under the condition of Table 11 according to the procedure of Example 5.

TABLE 11

| Combinaton in thickness of raw film | Run No. | | | |
|---|---|---|---|---|
| | 34 | 35 | 36 | 37 |
| First layer ($\mu$) | SBC$_{111}$ 140 | SBC$_{111}$ 120 | SBC$_{111}$ 120 | SBC$_{111}$ 120 |
| Second layer ($\mu$) | Io(E$_1$) 30 | PB(d$_1$) 50 | PDC-1 100 | PDC-1 50 |
| Third layer ($\mu$) | Ny$_1$ 100 | EVL-1 30 | Io(E$_1$) 30 | EVL-1 30 |
| Fourth layer ($\mu$) | Io(E$_1$) 30 | PB(d$_1$) 50 | Ny$_1$ 50 | Io(E$_1$) 30 |
| Fifth layer ($\mu$) | SBC$_{111}$ 300 | SBC$_{111}$ 250 | SBC$_{111}$ 200 | SBC$_{111}$ 200 |
| Total thickness ($\mu$) | 600 | 500 | 500 | 430 |

EVL-1: 99% saponificated EVA (ethylene content: 40 mol %)

TABLE 12

| Characteristics | Run No. | | | |
|---|---|---|---|---|
| | 34 | 35 | 36 | 37 |
| Haze (%) | 1.3 | 1.2 | 1.4 | 1.4 |
| Thermal property | | | | |
| 20% shrinkage temperature (°C.) | 65 | 59 | 60 | 58 |
| Maximum shrinkage (%) | 69 | 72 | 71 | 73 |
| Shrink tension (g/mm$^2$) | 190 | 220 | 200 | 210 |
| Tensile strength (Kg/mm$^2$) | 17.5 | 12.8 | 15.8 | 13.5 |
| Tensile elongation (%) | 160 | 150 | 180 | 170 |
| Dart impact strength (each thickness) (Kg · cm) | not less than 90 | not less than 90 | not less than 90 | not less than 90 |
| Strength of bar sealing (Kg/15 mm width) | 4.2 | 3.3 | 2.9 | 3.1 |
| O$_2$ permeability (cc/m$^2$ · day · atm) | 55 | 5 | 20 | 2 |
| Film thickness ($\mu$) | 50 | 42 | 40 | 37 |

The stretching was carried out at the temperatures of 46° C., 48° C., 39° C., and 42° C. in the films Run Nos. 34–37 respectively. The stretching was carried out stably and the characteristic properties of the resulted films were shown in Table 12.

Each of the sample Run Nos. of the present invention was remarkably good in the optical property, the low temperature shrink property, the shrink tension, the tensile strength, the impact strength, the sealing strength and the barrier property in comparison with the commercial wrapping film (d).

The practical wrapping test was carried out by wrapping 10 Kg of the raw meat with the film of Run No. 35 under vacuum and then passing it in the shower of hot water of 85° C. for 3 seconds thereby obtaining the good wrapping finish tightly fitted with goods.

Comparative Example 1

The raw tubular films having the combination of Table 13 were extruded according to the process of the above mentioned Example.

TABLE 13

| Combination in thickness of raw film | Comparative Run No. | | | | | | | | | | | |
|---|---|---|---|---|---|---|---|---|---|---|---|---|
| | 5 | 6 | 7 | 8 | 9 | 10 | 11 | 12 | 13 | 14 | 15 | 16 |
| First layer | a$_1$ 200 | b$_1$ 100 | c$_1$ 200 | a$_1$ 100 | Ny$_1$ 10 | c$_1$ 50 | a$_3$ 60 | a$_1$ 80 | a$_3$ 40 | 2$_1$ 100 | PDC-1 300 | PDC-1 300 |
| Second layer | | | | b$_1$ 50 | a$_1$ 130 | b$_1$ 100 | PDC-1 80 | Io(E$_1$) 10 | b$_1$ 10 | PDC-1 50 | a$_1$ 100 | PP$_1$ 100 |
| Third layer | | | | c$_1$ 100 | Ny$_1$ 10 | c$_1$ 50 | a$_3$ 60 | EVL-1 30 | PET 30 | a$_1$ 50 | | |
| Fourth layer | | | | | | | | Io(E$_1$) 10 | a$_3$ 30 | | | |
| Fifth layer | | | | | | | | a$_1$ 70 | Io(E$_1$) 40 | | | |
| Total thickness ($\mu$) | 200 | 100 | 200 | 200 | 150 | 200 | 200 | 200 | 150 | 200 | 400 | 400 |
| Stretching temperature (°C.) | 20 150 | 20 100 | 20 150 | 20 150 | 20 100 | 20 100 | 20 100 | 20 100 | 20 100 | 20 100 | 20 100 | 20 100 |

Note:
a$_3$ was EVA (VAC content 6% by weight (2.1 mol %), MI 0.9, VSP 79° C., MP 102° C.).

As the result, the film of the comparative sample Run No. 5 could not be stretched at all at the temperature in the range of 20 to 130. At the stretching temperature of 20°–80° C., the film was inflated to some extent and sustained puncture thereby restoring in its former condition. And at the stretching temperature of 140° C., the film was stretched to a film 13$\mu$ in thickness with difficulty. This film had Haze of 6.8%, the 20% shrinkage temperature of 120° C., the shrink tension of 3 gr/mm$^2$, the tensile strength of 2.1 Kg/mm$^2$, the elongation of 490% and the dart impact strength of 5 Kg.cm. These characteristic properties were different from those of the present invention.

The film of the comparative sample Run No. 6 could not be stretched at all even at the temperature of 100° C. and sustained puncture. The raw film was apt to cause the brocking and to become soft and sticky.

The film of the comparative example Run No. 7 could not be stretched at all at the temperature of 20°–130° C. and sustained puncture and at the temperature of 145° C., the film could be very unstably stretched with difficulty. However, the resulted film had the same extent of the characteristic properties to those of the commercial PP shrink film.

The film of the comparative sample Run No. 8 could not be stretched and merely sustained puncture at the temperature of 20°–130° C. and at the temperature of about 150° C., the film could be stretched with the unstable state. This film was whitish and easily broken.

There was merely obtained the film having the bad optical property of Haze 6.2%.

The films of the comparative samples Run Nos. 9 and 10 could not be stretched at the temperature of 20°–100° C.

The film of the comparative sample Run No. 11 could be somewhat inflated by blowing the compressed air into the raw tubular film at the beginning of blowing but sustained puncture. The film could not be continuously stretched. And at the stretching temperature of 130° C., there was merely obtained the whitish and ill-balanced film having the large partiality in thickness in small quantities. This film sustained puncture.

The films of the comparative samples Run Nos. 12 and 13 could not be stretched at the temperature of 20°–100° C. and sustained puncture.

The film of the comparative sample Run No. 14 was stretched after treating it with the energy ray (electron ray) of 5 Mrad, but the film could not be stretched and sustained puncture. At the temperature of 140°–150° C., this film could be stretched to the film 15μ in thickness. This film had Haze of 7.5%., the 20% shrinkage temperature of 115° C., the shrink tension of 20 gr/mm$^2$, the tensile strength of 2.8 Kg/mm$^2$, the elongation of 39%, the dart impact strength of 8 Kg.cm and the $O_2$-barrier property of 150 cc/m$^2$.day.atm. These characteristic properties of this film were inferier to those of the film of the present invention.

The film of the comparative sample Run No. 15 could be somewhat inflated like the bubble at the beginning of blowing but sustained puncture.

The film of the comparative sample Run No. 16 sustained puncture at the beginning of stretching and the test piece could not be obtained.

What is claimed is:

1. A cold drawn high-orientation multilayered film, having a particle tensile strength of not less than 5.0 Kg/mm$^2$, the principal component layers of said film being highly oriented, said multilayer film comprising at least one layer preponderantly comprising a cold-drawable resin selected from the group consisting of blended and unblended specific polymers, [1] (B)+(A)+(C), [2] (B)+(A), [3] (B)+(C), [4] (D), and [5] (E), wherein,
   (A) is at least one ethylene type polymer selected from the group consisting of copolymers of ethylene with another monomer selected from the group consisting of vinyl esters, aliphatic unsaturated carboxylic acids and alkyl esters of said carboxylic acids, ionically crosslinked resins derived from said copolymers and low-density polymers of ethylene,
   (B) is a soft copolymer elastomer having a Vicat softening point of not more than 60° C.,
   (C) is at least one polymer selected from the group consisting of crystalline polypropylene, high-density polyethylene, crystalline polybutene-1, and polymethyl pentene-1,
   (D) is a crystalline polybutene-1 having a concentration of 50 to 100% by weight, and
   (E) is an ionically crosslinked resin, said multilayered film possessing at least two resin layers selected from the group consisting of at least one cold-drawable resin layer ($CDR_5$) preponderantly containing a polymer [5], at least one cold-drawable resin layer ($CDR_{1-3}$) preponderantly containing at least one cold-drawable resin selected from the group consisting of blended polymers [1], [2], [3], at least one cold-drawable resin layer ($CDR_4$) preponderantly containing a polymer [4], and at least one layer (S) formed of at least one polymer selected from the group consisting of crystalline polypropylene, polyethylene, ethylene-vinyl acetate copolymer, ethylene-aliphatic unsaturated carboxylic acid copolymers and ethylene-aliphatic unsaturated carboxylate copolymers,
   and said film having a multilayer construction represented by the layer combination of
   $CDR_5/CDR_{1-3}$,
   $CDR_5/CDR_{1-3}/CDR_5$,
   $CDR_5/S/CDR_5$, or
   $CDR_5/CDR_{1-3}/CDR_4/CDR_{1-3}/CDR_5$.

2. The multilayered film according to claim 1, wherein the polymer (A) of the blended specific polymers [1] and [2] is at least one member selected from the group consisting of ethylene-vinylacetate copolymer, ethylene-acrylate copolymer, ethylene-acrylic acid copolymer, ethylene-methacrylate copolymer and ethylene-methacrylic acid copolymer.

3. The multilayered film according to claim 1 or 2, wherein the polymer (A) of the blended specific polymers [1] and [2] is an ethylene-vinyl acetate copolymer containing 1 to 13 mol% of vinyl acetate group and having a melt index within the range of from 0.2 to 10.

4. The multilayered film according to claim 1, wherein the polymer (A) of the blended specific polymers [1] and [2] is an ionically crosslinked resin which is a copolymer of ethylene and aliphatic unsaturated carboxylic acid, the carboxyl group of said copolymer being at least partially ionized with metal, and said ionically crosslinked resin is obtained by at least partially saponifying an aliphatic unsaturated alkyl carboxylate and then subjecting the product of saponification to at least partial ioni bonding with metal.

5. The multilayered film according to claim 1, wherein the polymer (B) of the blended specific polymers [1], [2] and [3] is a copolymer elastomer containing 90 to 20 mol% of ethylene.

6. The multilayered film according to claim 1, wherein the polymer (B) of the blended specific polymers [1], [2] and [3] is a copolymer elastomer containing 88 to 40 mol% of ethylene.

7. The multilayered film according to claim 1, wherein the polymer (B) of the blended specific polymers [1], [2] and [3] is a soft copolymer comprising ethylene and at least one member selected from the group consisting of α-olefins of 3 to 12 carbon atoms and possessing a Vicat softening point of not more than 50° C. and a crystallization degree of not more than 30%.

8. The multilayered film according to claim 7, wherein the polymer (B) of the blended specific polymers [1], [2] and [3] is a random copolymer whose α-olefin component is one member selected from the group consisting of propylene and butene-1.

9. The multilayered film according to claim 1 or 7, wherein the copolymer elastomer of the polymer (B) of the blended specific polymers [1], [2] and [3] is a copolymer of ethylene with an α-olefin and a small amount of a polyene.

10. The multilayered film according to claim 9, wherein the copolymer elastomer is a copolymer containing not more than 5 mol% of a non-conjugated diene selected from the group consisting of polyenes, hexadiene, pentadiene and norbornene derivatives.

11. The multilayered film according to claim 1, wherein the polymer (C) of the blended specific polymers [1] and [3] is a rigid polymer having a Vicat softening point of not less than 100° C.

12. The multilayered film according to claim 1, wherein the polymer (C) of the blended polymers [1] and [3] is a crystalline polypropylene containing 0 to 7 mol% of ethylene or other α-olefin as a modifier.

13. The multilayered film according to claim 1, wherein the cold-drawable resin of the specific polymer [1] has a composition such as to satisfy the relations to $0.90 \geq B/(A+B) \geq 0.05$ and $2.0 \geq C/(A+B) \geq 0.05$, that of the specific polymer [2] a composition to satisfy the relation of $0.90 \geq B/(A+B) \geq 0.05$, and that of the specific polymer [3] a composition to satisfy the relation of $0.90 \geq B/(B+C) \geq 0.30$.

14. The multilayered film according to claim 1 or 13, wherein the cold-drawable resin of the specific polymer [1] has a composition such as to satisfy the relations of $0.70 \geq B/(A+B) \geq 0.07$ and $1.0 \geq C/(A+B) \geq 0.10$, that of the specific polymer [2] a composition to satisfy the relation of $0.70 \geq B/(A+B) \geq 0.07$, and that of the specific polymer [3] a composition to satisfy the relation of $0.87 \geq B/(B+C) \geq 0.40$.

15. The multilayered film according to claim 1, wherein the film contains at least one layer formed of the polymer [1].

16. The multilayered film according to claim 1, wherein the specific polymer [4] is included and is a polymer containing not less than 85 mol % of a butene-1 component and having a melt index within the range of from 0.1 to 20.

17. The multilayered film according to claim 1, wherein there is a layer formed of the specific polymer [4] and it contains at least 80% by weight of crystalline polybutene-1.

18. The multilayered film according to claim 1, wherein
layer formed predominantly of the specific polymer [5] which contains 50 to 100% by weight of an ionically crosslinked resin which is a copolymer of ethylene and aliphatic unsaturated carboxylic acid, the carboxyl group of said copolymer being at least partially ionized with metal, and said ionically crosslinked resin is obtained by at least partially saponifying an aliphatic unsaturated alkyl carboxylate and then subjecting the product of saponification to at least partial ionic bonding with metal.

19. The multilayered film according to claim 1, wherein there is a layer formed of blended polymers selected from the group consisting of blended specific polymers [1], [2] and [3] which contains at least 50% by weight of the blended polymers.

20. The multilayered film according to claim 1, wherein the layer formed of the cold-drawable resin selected from the group of blended and unblended specific polymers [1] through [5] inclusive has a thickness accounting for at least 20% of the total thickness of the film.

21. The multilayered film according to claim 1 or 20, wherein the layer formed of the cold-drawable resin has a thickness accounting for at least 50% of the total thickness of the film.

22. The multilayered film according to claim 1, wherein there is a cold-drawable resin selected from the group consisting of blended and unblended specific polymers [1], [2], [3] and [5] which is treated with an activated energy ray to an extent such as to contain 0 to 50% by weight of an insoluble gel in boiling xylene and possess a melt index of not more than 0.5.

23. The multilayered film according to claim 1, wherein the component layers of the film excepting the layer containing the cold-drawable resin include at least one layer formed of at least one polymer selected from the group consisting of crystalline polypropylene, polyethylene, ethylene-vinyl acetate copolymer, ethylene-aliphatic unsaturated carboxylic acid copolymers and ethylene-aliphatic unsaturated carboxylate copolymers.

24. The multilayered film according to claim 1, wherein the component layers of the film excepting the layer containing the cold-drawable resin includes, at the adhesive layer, at least one layer formed of one member selected from the group consisting of ethylene-vinyl acetate copolymer, ethylene-α-olefin copolymer elastomers, ethylene-aliphatic unsaturated carboxylic acid copolymers and derivatives thereof, and block-copolymerized elastomers of styrene-conjugated diene type monomers.

25. The multilayered film according to claim 1, wherein the layer containing the cold-drawable resin of the specific polymer [4] has deposited on at least one surface thereof a layer formed preponderantly of crystalline polypropylene.

26. The multilayered film according to claim 1 or 25, wherein the film is composed of at least three layers including, as the intermediate layer, the layer containing the cold drawable resin of the specific polymer [4].

27. The multilayered film according to claim 1, wherein the film is composed of at least three layers including at least one inner layer formed of blended specific polymers selected from [1], [2], and [3] and at least one outer layer formed predominantly of the ionically crosslinked polymer [5].

28. The multilayered film according to claim 1 wherein the film has a tensile strength of not less than 7 Kg/mm² and an elongation of not less than 100%.

29. The multilayered film according to claim 1, wherein the film has a Haze of not more than 4.0%.

30. The multilayered film according to claim 1, wherein the film has a heat shrink tension of not less than 50 gr/mm².

31. The multilayered film according to claim 1 or 30, wherein the film has a heat shrink tension of not less than 100 gr/mm².

32. The multilayered film according to claim 1, wherein the film has a shrinkage gradient of not more than 2.0.

33. The multilayered film according to claim 1, wherein the temperature at the heat shrinkage of 20% is not more than 85° C.

* * * * *